US011568443B2

(12) United States Patent
Nagasaka

(10) Patent No.: US 11,568,443 B2
(45) Date of Patent: Jan. 31, 2023

(54) INFORMATION PROCESSING APPARATUS, INFORMATION PROCESSING METHOD, AND PROGRAM

(71) Applicant: Sony Corporation, Minato-ku (JP)

(72) Inventor: Hideo Nagasaka, Kanagawa (JP)

(73) Assignee: SONY CORPORATION, Toyko (JP)

( * ) Notice: Subject to any disclaimer, the term of this patent is extended or adjusted under 35 U.S.C. 154(b) by 0 days.

(21) Appl. No.: 16/331,982

(22) PCT Filed: Aug. 3, 2017

(86) PCT No.: PCT/JP2017/028168
§ 371 (c)(1),
(2) Date: Mar. 11, 2019

(87) PCT Pub. No.: WO2018/083850
PCT Pub. Date: May 11, 2018

(65) Prior Publication Data
US 2019/0259060 A1    Aug. 22, 2019

(30) Foreign Application Priority Data

Nov. 1, 2016 (JP) .............................. JP2016-214112

(51) Int. Cl.
*G06Q 30/00* (2012.01)
*G06Q 30/02* (2012.01)
(Continued)

(52) U.S. Cl.
CPC .......... *G06Q 30/0255* (2013.01); *G06F 3/16* (2013.01); *G06F 13/00* (2013.01); *G06Q 30/0269* (2013.01); *G10L 15/22* (2013.01)

(58) Field of Classification Search
CPC .. G06Q 30/0255; G06Q 30/0269; G06F 3/16; G06F 13/00; G10L 15/22
(Continued)

(56) References Cited

U.S. PATENT DOCUMENTS

2003/0139976 A1   7/2003 Hanai et al.
2009/0094033 A1*  4/2009 Mozer ..................... G10L 15/22
                                                            704/251
(Continued)

FOREIGN PATENT DOCUMENTS

JP    2003-288532 A    10/2003
JP    2009-276377 A    11/2009
(Continued)

OTHER PUBLICATIONS

S. Sae-Ueng, S. Pinyapong, A. Ogino and T. Kato, "Personalized Shopping Assistance Service at Ubiquitous Shop Space," 22nd International Conference on Advanced Information Networking and Applications—Workshops (aina workshops 2008), 2008, pp. 838-843, doi: 10.1109/WAINA.2008.287. (Year: 2008).*
(Continued)

*Primary Examiner* — Sun M Li
(74) *Attorney, Agent, or Firm* — Xsensus LLP

(57) ABSTRACT

To provide more useful additional information to the user at a more effective timing.
Provided is an information processing apparatus including an output control unit that controls an output of additional information related to a product purchased by a user. The output control unit controls an output of the additional information on the basis of delivery information about the product. In addition, provided is an information processing method that is executed by a processor, the information processing method including controlling an output of additional information related to a product purchased by a user. The controlling of an output includes controlling an output of the additional information on the basis of delivery information about the product.

16 Claims, 15 Drawing Sheets

(51) Int. Cl.
*G10L 15/22* (2006.01)
*G06F 13/00* (2006.01)
*G06F 3/16* (2006.01)

(58) Field of Classification Search
USPC ...................................................... 705/14.53
See application file for complete search history.

(56) References Cited

U.S. PATENT DOCUMENTS

| | | | |
|---|---|---|---|
| 2010/0114727 A1* | 5/2010 | Khandelwal | G06Q 30/06 705/26.1 |
| 2013/0046637 A1 | 2/2013 | Slutsky | |
| 2013/0343615 A1 | 12/2013 | Zhang | |
| 2014/0052537 A1 | 2/2014 | Garnet | |
| 2014/0052573 A1 | 2/2014 | Oh et al. | |
| 2014/0172894 A1 | 6/2014 | Argue et al. | |
| 2015/0058170 A1 | 2/2015 | Osaka et al. | |
| 2015/0149316 A1* | 5/2015 | Chen | G06Q 30/0635 705/26.2 |
| 2016/0078504 A1* | 3/2016 | Kennewick, Sr. | G10L 15/1815 705/26.1 |
| 2016/0104200 A1* | 4/2016 | Osotio | G06Q 30/0267 705/14.64 |
| 2016/0162973 A1 | 6/2016 | Lee et al. | |
| 2016/0180391 A1* | 6/2016 | Zabaneh | G06F 16/9535 705/14.58 |

FOREIGN PATENT DOCUMENTS

| | | |
|---|---|---|
| JP | 2015-191576 A | 11/2015 |
| JP | 2015191576 A | 11/2015 |
| JP | 2016-012349 A | 1/2016 |
| JP | 2016012349 A | 1/2016 |
| JP | 2017-091268 A | 5/2017 |
| JP | 2017091268 A | 5/2017 |
| WO | 2016/136062 A1 | 9/2016 |

OTHER PUBLICATIONS

Method and System for Recommending a Product Shelf Based on a Purchase History of a User An IP.com Prior Art Database Technical Disclosure, IP.com No. IPCOM000238808D Authors et al.: Disclosed Anonymously, IP.com Electronic Publication Date: Sep. 18, 2014 (Year: 2014).*
Automation of point of purchase processing using multimodal interaction An IP.com Prior Art Database Technical Disclosure Authors et al.: Original Publication Date: May 3, 2005 IP.com No. IPCOM000124639D IP.com Electronic Publication Date: May 3, 2005 (Year: 2005).*
International Search Report dated Oct. 17, 2017 for PCT/JP2017/028168 filed on Aug. 3, 2017, 11 pages including English Translation.
Extended Search Report issued in European Application 17866748.1-1217 dated Oct. 24, 2019.

* cited by examiner

FIG. 8

| PRODUCT NAME | DELIVERY STATUS | DELIVERY DATE | PURCHASER | PURCHASE DATE | PURCHASE COUNT | TARGET | OUTPUT PRIORITY |
|---|---|---|---|---|---|---|---|
| BEEF | DELIVERED | 8/3 | USER U1 | 8/1 | 1 | MEN/WOMEN | — |
| RICE | DELIVERED | 9/15 | USER U1 | 9/13 | 10 | MEN/WOMEN | LOW |
| EGGS | DELIVERED | 9/15 | USER U1 | 9/13 | 8 | MEN/WOMEN | LOW |
| PUMPKIN | DELIVERED | 9/15 | USER U1 | 9/13 | 1 | MEN/WOMEN | HIGH |
| NECKTIE | DELIVERED | 9/15 | USER U1 | 9/13 | 1 | MEN | HIGH |
| LIPSTICK | DELIVERED | 9/15 | USER U1 | 9/13 | 1 | WOMEN | HIGH |
| BLUSH | DELIVERED | 9/15 | USER U1 | 9/13 | 1 | WOMEN | HIGH |
| RAZOR | SHIPPED | | USER U2 | 9/17 | 5 | MEN | LOW |

INFORMATION PROCESSING APPARATUS, INFORMATION PROCESSING METHOD, AND PROGRAM

CROSS-REFERENCE TO RELATED APPLICATIONS

The present application is based on PCT filing PCT/JP2017/028168, filed Aug. 3, 2017, which claims priority to JP 2016-214112, filed Nov. 1, 2016, the entire contents of which are incorporated herein by reference.

TECHNICAL FIELD

The present disclosure relates to an information processing apparatus, an information processing method, and a program.

BACKGROUND ART

Recently, along with the development of information processing technology, a variety of electronic commerce is being carried out. For example, a user is able to utilize an electronic commerce (EC) site or the like to purchase products casually. Also, in electronic commerce like the above, many technologies for improving the user's buying motivation and convenience have been proposed. For example, Patent Literature 1 discloses a technology that provides information about consumables and options incidental to a product that a user has selected or purchased. Also, Patent Literature 2 discloses a technology that displays advertising information according to an expiration date of a product that a user has purchased.

CITATION LIST

Patent Literature

Patent Literature 1: JP 2009-276377A
Patent Literature 2: JP 2003-288532A

DISCLOSURE OF INVENTION

Technical Problem

However, for example, in the case of purchasing a product on an EC site or the like, in many cases the user has no in purchasing anything other than an intended product, and it is anticipated that even if incidental information or advertising information like the above is displayed, the user will not pay attention to the information. Also, by continuing to display information that the user has no interest in, there is also concern that the user's buying motivation will fall.

Accordingly, the present disclosure proposes a novel and improved apparatus capable of providing more useful information to the user at a more effective timing.

Solution to Problem

According to the present disclosure, there is provided an information processing apparatus including an output control unit that controls an output of additional information related to a product purchased by a user. The output control unit controls an output of the additional information on the basis of delivery information about the product.

In addition, according to the present disclosure, there is provided an information processing method that is executed by a processor, the information processing method including controlling an output of additional information related to a product purchased by a user. The controlling of an output includes controlling an output of the additional information on the basis of delivery information about the product.

In addition, according to the present disclosure, there is provided a program for causing a computer to function as an information processing apparatus including an output control unit that controls an output of additional information related to a product purchased by a user. The output control unit controls an output of the additional information on the basis of delivery information about the product.

Advantageous Effects of Invention

According to the present disclosure as described above, it becomes possible to provide more useful additional information to the user at a more effective timing.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 8 is a diagram illustrating one example of purchase history information and delivery history information referenced by an output control unit according to the embodiment.

MODE(S) FOR CARRYING OUT THE INVENTION

Figure 1:
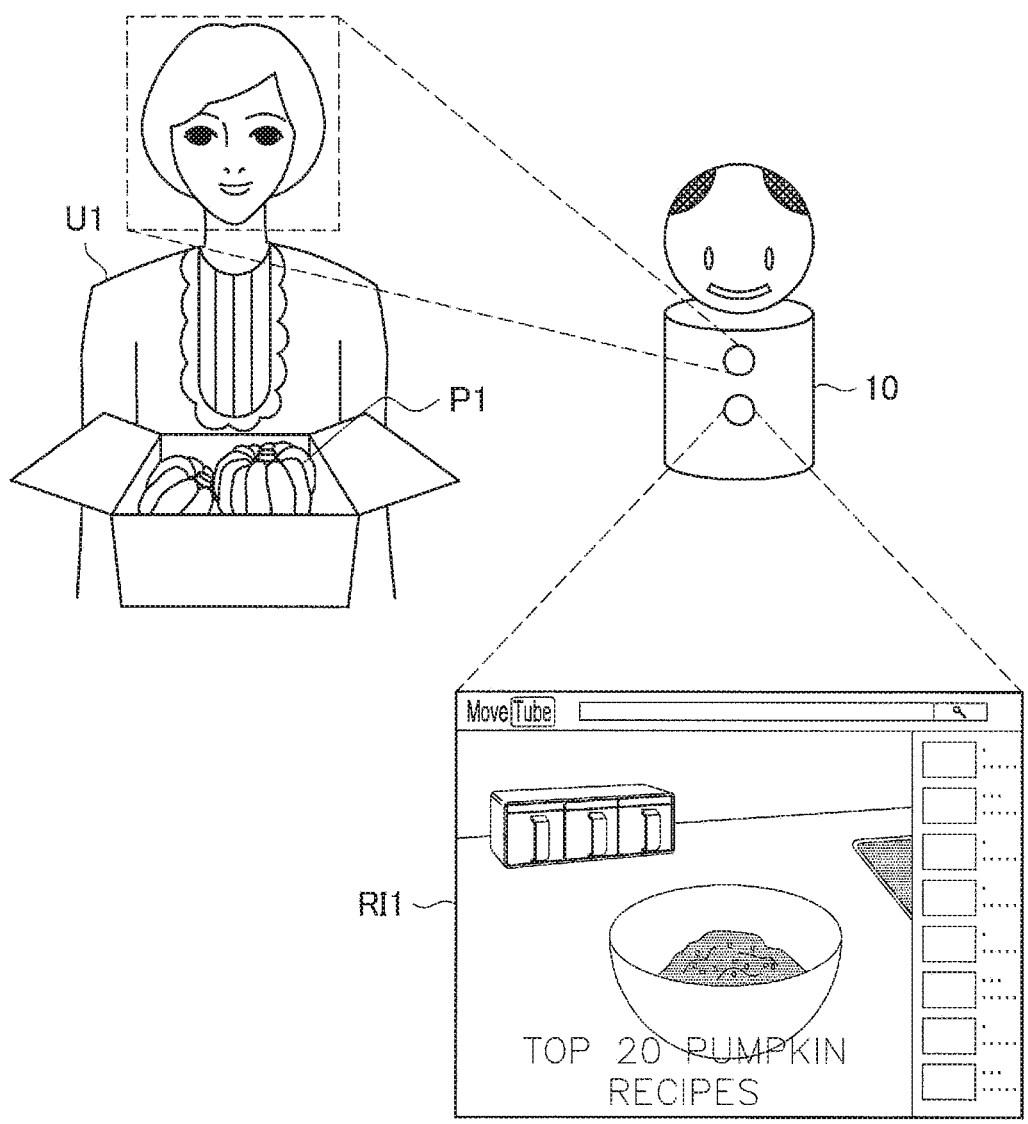
FIG. 1 is a diagram for explaining an overview of one embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.

1. Embodiment
 1.1. Overview of Embodiment
 1.2. Exemplary System Configuration
 1.3. Exemplary Functional Configuration of Information Processing Terminal 10
 1.4. Exemplary Functional Configuration of Information Processing Server 20
 1.5. Exemplary Output Control of Additional Information
 1.6. Management and Personalization of Additional Information
 1.7. Flow of Operations of Information Processing Server 20
2. Hardware Configuration Example
3. Conclusion

1. EMBODIMENT

1.1. Overview of Embodiment

First, an overview of one embodiment according to the present disclosure will be described. As described above, in recent years, a variety of EC sites are being run by many corporations, and various corporate efforts are being carried out to raise the buying motivations of users. Corporate efforts like the above include, for example, improving the user's buying motivation with respect to a product by posting advertising information about the product with a video or the like on the EC site. However, for a user who has already decided to purchase the product, advertising information like the above is not very useful in many cases. Also, for a user who is visiting the EC site to purchase another product, viewing advertising information like the above is difficult in many cases.

Also, on the other hand, attempts are also being made to improve user satisfaction by providing utilization information about a product, and inducing repeat purchasing of the product and the purchasing of related products. However, when purchasing a product, since the actual product is not at hand, it is difficult for a user to make use of the viewed information on the spot. For this reason, the user has weak motivation to view utilization information like the above at the time of purchase, and even in the case of viewing such utilization information, the effect of the utilization information is expected to be weak.

The technical idea according to the present embodiment was conceived by focusing on the above point, and makes it possible to provide additional information about a product at a more effective timing. FIG. 1 is a diagram for explaining an overview of the present embodiment. FIG. 1 illustrates an information processing terminal 10 that includes a function of providing additional information RI1 about a product to a user. Also, FIG. 1 illustrates a user U1 and a product P1 that the user U1 has purchased.

At this point, the information processing terminal 10 according to the present embodiment preferably outputs the additional information RI1 about the product P1 on the basis of a completion of a delivery related to the product P1 being detected and also recognized by the user U1, for example. In this way, according to the technical idea according to the present embodiment, utilization information about the product P1 can be provided to the user U1 in a situation in which the user U1 is actually able to utilize the product P1. In other words, according to the technical idea according to the present embodiment, it becomes possible to provide additional information at a more valuable timing to the user, and an improvement in user satisfaction, and by extension an improvement in buying motivation, is expected to be achieved.

1.2. Exemplary System Configuration

Next, an exemplary system configuration according to the present embodiment will be described. FIG. 1 is a diagram for explaining an exemplary system configuration according to the present embodiment. Referring to FIG. 1, the information processing system according to the present embodiment may include an information processing terminal 10, an information processing server 20, a content server 30, a purchase history DB 40, and a delivery history DB 50. Also, the information processing server 20 is connected to each of the above apparatus via a network 60.

Information Processing Terminal 10

The information processing terminal 10 according to the present embodiment is an information processing apparatus that provides additional information to a user. Also, the information processing terminal 10 according to the present embodiment preferably include a function of collecting sensor information related to the user, a product, and the like. Note that in FIG. 1, a case in which the information processing terminal 10 is a robot agent and the additional information is projected onto a tabletop, a wall face, or the like is illustrated as an example, but the information processing terminal 10 according to the present embodiment may be any of various types of information processing apparatus including a function of providing additional information and a function of collecting sensor information. For example, the information processing terminal 10 according to the present embodiment may be a personal computer (PC), a smartphone, a tablet, a mobile phone, any of various types of agents, or the like.

Information Processing Server 20

The information processing server 20 according to the present embodiment includes a function of acquiring additional information from a content server 30, or access information to additional information, on the basis of purchase history information and the like acquired from and a purchase history DB 40. Additionally, the information processing server 20 according to the present embodiment is an information processing apparatus that causes the information processing terminal 10 to output acquired additional information on the basis of sensor information collected by the information processing terminal 10, delivery information acquired from a delivery history DB 50, and the like.

Content Server 30

The content server 30 according to the present embodiment is a server that stores or distributes additional information related to products. Note that the additional information according to the present embodiment includes product-related utilization information, advertising information, campaign information, and the like. Note that the above utilization information may be information made public by the manufacturer or distributor of the product, and may also be information made public by users, such as recipe information using the product, clothing style information using the product, and the like, for example. Also, the additional information according to the present embodiment includes video, images, text, audio, and the like. The content server 30 according to the present embodiment may be a server set up by the same business as the business that runs the information processing server 20, or may be a server set up by the product manufacturer or the like. In addition, the content server 30 may also be a server set up by a third party that provides an external service such as a video streaming service, for example. Also, multiple content servers 30 according to the present embodiment may be set up.

Purchase History DB 40

The purchase history DB 40 according to the present embodiment is a database that stores purchase history information about a user on an EC site or the like. In addition, the purchase history DB 40 according to the present embodiment preferably also stores purchase origin information related to the product. Purchase origin information according to the present embodiment will be described in detail separately. Note that the purchase history DB 40 according to the present embodiment may also include a function of storing purchase history information input by the user.

Delivery History DB 50

The delivery history DB 50 according to the present embodiment is a database that stores delivery information related to the delivery status of a product purchased by the user. The delivery information stored by the delivery history DB 50 may be an apparatus set up by a delivery company, or an apparatus that updates the delivery information on the basis of information acquired from the apparatus set up by the delivery company.

Network 60

The network 60 includes a function of connecting the information processing terminal 10, the information processing server 20, the content server 30, the purchase history DB 40, and the delivery history DB 50. The network 60 may include a public network such as the Internet, a telephone network, or a satellite communication network, and various types of local area networks (LANs) or wide area networks (WANs) including Ethernet (registered trademark). Additionally, the network 60 may also include a dedicated network such as an Internet Protocol virtual private network (IP-VPN). Additionally, the network 60 may also include a wireless communication network such as Wi-Fi (registered trademark) or Bluetooth (registered trademark).

Figure 2:
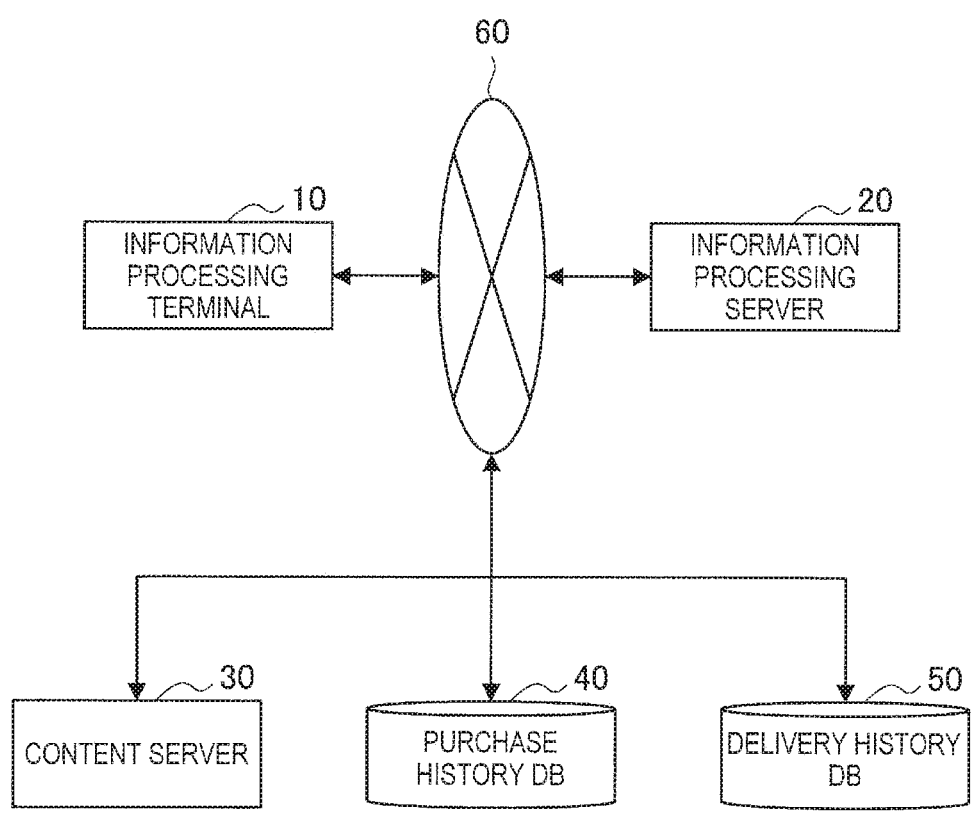
FIG. 2 is a diagram illustrating an exemplary system configuration according to the embodiment.

The above describes an exemplary system configuration according to the present embodiment. Note that in the above description using FIG. 2, a case in which the information processing terminal 10 and the information processing server 20 are realized as information processing apparatus independent of each other is described as an example, but the exemplary system configuration according to the present embodiment is not limited to such an example. Each function included in the information processing terminal 10 and the information processing server 20 according to the present embodiment may also be realized by a single information processing apparatus.

On the other hand, each function included in the information processing terminal 10 and the information processing server 20 according to the present embodiment may also be realized by a plurality of three or more information processing apparatus. The exemplary system configuration according to the present embodiment may be modified flexibly according to the system specifications, operating conditions, and the like.

1.3. Exemplary Functional Configuration of Information Processing Terminal 10

Figure 3:
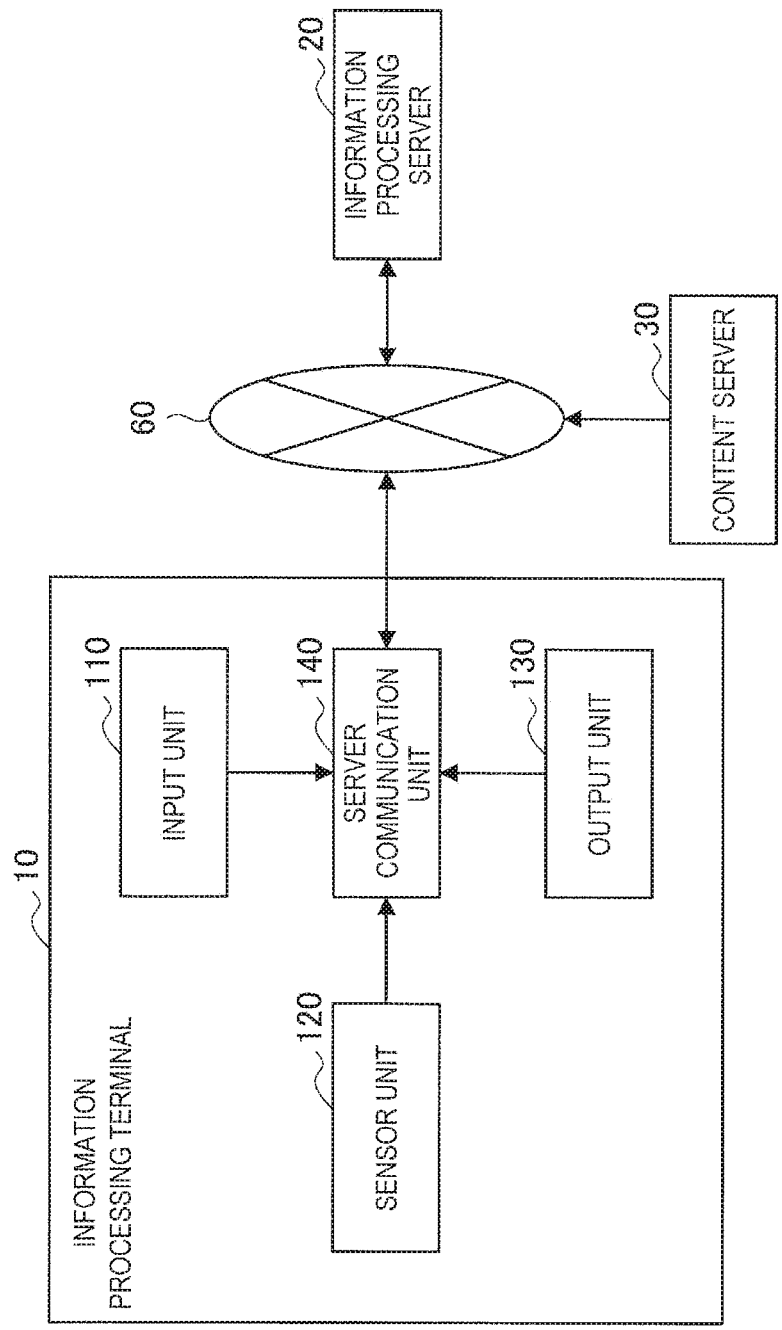
FIG. 3 is a function block diagram of an information processing terminal according to the embodiment.

Next, an exemplary functional configuration of the information processing terminal 10 according to the present embodiment will be described. FIG. 3 is a function block diagram of the information processing terminal 10 according to the present embodiment. Referring to FIG. 3, the information processing terminal 10 according to the present embodiment is provided with an input unit 110, a sensor unit 120, an output unit 130, and a server communication unit 140. Hereinafter, the characteristics of each of the above components will be described in detail.

Input Unit 110

The input unit 110 includes a function of receiving user operations by the user. The input unit 110 according to the present embodiment may be realized by various buttons, a keyboard, a touch panel, a mouse, a switch, and the like, for example. Also, the input unit 110 preferably includes a microphone or the like.

Sensor Unit 120

The sensor unit 120 includes a function of collecting various sensor information related to the user or a product. For this reason, the sensor unit 120 according to the present embodiment may include, for example, an imaging sensor, a microphone, various optical sensors including an infrared sensor, a radar, a clock, Global Positioning System (GPS), Wi-Fi, an acceleration sensor, a gyro sensor, a geomagnetic sensor, and the like.

Output Unit 130

The output unit 130 includes a function of output additional information about a product to the user on the basis of control by an output control unit 230 of the information processing server 20. Herein, the additional information according to the present embodiment preferably includes visual information and auditory information. For this reason, the output unit 130 may include a display apparatus and a speaker, for example. Herein, the above display apparatus may be realized by a cathode ray tube (CRT) display apparatus, a liquid crystal display (LCD) apparatus, an organic light-emitting diode (OLED) apparatus, a touch panel, a projector, or the like, for example.

Server Communication Unit 140

The server communication unit 140 includes a function of communicating information with the information processing server 20 and the content server. Specifically, the server communication unit 140 according to the present embodiment transmits input information received by the input unit 110 and sensor information collected by the sensor unit 120 to the information processing server 20. Also, the server communication unit 140 according to the present embodiment receives an output control signal generated by the information processing server 20. At this point, the above output control signal may also include additional information acquired from the content server 30. Additionally, the server communication unit 140 may also acquire additional information from the content server 30 on the basis of access information included in the above output control signal.

The above describes an exemplary functional configuration of the information processing terminal 10 according to the present embodiment. Note that the exemplary functional configuration described above is merely one example, and the functional configuration of the information processing terminal 10 according to the present embodiment is not limited to such an example. The information processing terminal 10 according to the present embodiment additionally may be provided with a configuration that realizes various functions included in the information processing server 20. For example, the information processing terminal 10 may also be provided with some or all of a recognition unit 210, a speech processing unit 220, the output control unit 230, and a learning unit 240 described later.

In addition, each function included in the information processing terminal 10 according to the present embodiment may also be realized by multiple independent apparatus. For example, the function of the sensor unit 120 according to the present embodiment may be realized by an imaging apparatus, a microphone, a sensor apparatus, or the like independent from the information processing terminal 10. The functional configuration of the information processing terminal 10 according to the present embodiment may be modified flexibly.

1.4. Exemplary Functional Configuration of Information Processing Server 20

Figure 4:
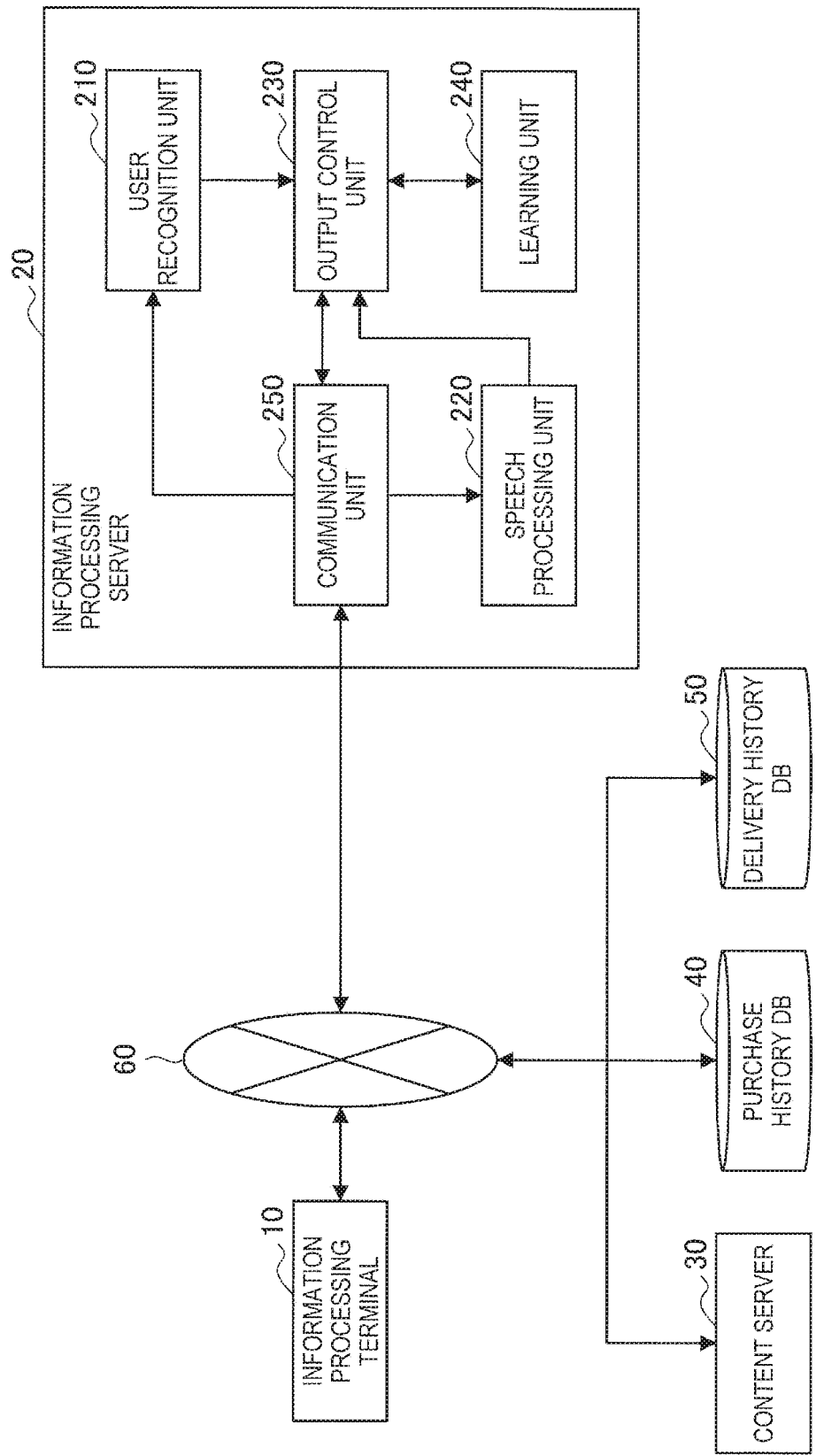
FIG. 4 is a function block diagram of an information processing server according to the embodiment.

Next, an exemplary functional configuration of the information processing server 20 according to the present embodiment will be described. FIG. 4 is a function block diagram of the information processing server 20 according to the present embodiment. Referring to FIG. 4, the information processing server 20 according to the present embodiment is provided with the recognition unit 210, the speech processing unit 220, the output control unit 230, the learning unit 240, and a communication unit 250. Hereinafter, the characteristics of each of the above components will be described in detail.

Recognition Unit 210

The recognition unit 210 includes a function of recognizing the user on the basis of sensor information collected by the information processing terminal 10. For example, the recognition unit 210 according to the present embodiment may recognize the presence of the user on the basis of information collected from the infrared sensor. Also, for example, the recognition unit 210 may identify the user individually or execute user clustering from an estimated gender, age, and the like on the basis of collected image information. Additionally, the recognition unit 210 may also execute the above recognition based on collected speech information.

In addition, the recognition unit 210 according to the present embodiment may also include a function of recognizing a product on the basis of sensor information collected by the information processing terminal 10. For example, the recognition unit 210 according to the present embodiment is also capable of recognizing a product by an object recognition process based on collected image information. Additionally, for example, the recognition unit 210 may also recognize a product on the basis of sensor information acquired from an identifier such as a barcode affixed to the product.

Speech Processing Unit 220

The speech processing unit 220 includes a function of executing speech recognition on the basis of utterance information collected by the information processing terminal 10. The speech processing unit 220 preferably converts a speech signal included in the above utterance information to character string information. Also, the speech processing unit 220 includes a function of extracting an utterance intention of a user on the basis of the above converted character string information.

Output Control Unit 230

The output control unit 230 includes a function of controlling the output of additional information related to a product on the basis of a product purchased by the user. More specifically, the output control unit 230 according to the present embodiment preferably generates an output control signal related to the control of the output of additional information. The additional information acquired from the content server 30 on the basis of the product above may be included in the output control signal, or access information related to the additional information may be included in the output control signal.

Also, at this point, the output control unit 230 according to the present embodiment causes the information processing terminal 10 to output the above additional information on the basis of the user being recognized by the recognition unit 210. By having the output control unit 230 cause additional information related to the product to be output on the basis of the user being recognized, it becomes possible for the user to view the additional information reliably.

Note that, for example, the output control unit 230 may control the output of additional on the basis of a product recognized by the recognition unit 210, or control the output of the additional information on the basis of product information input by the user. Besides being a product that the user has purchased on an EC site, the above product may also include a product purchased at an actual store.

Additionally, the output control unit 230 according to the present embodiment may control the output of the additional information on the basis of delivery information about the product acquired from the delivery history DB 50. The output control unit 230 is able to acquire the above delivery information on the basis of the purchase history information acquired from the purchase history DB 40. At this time, the output control unit 230 may cause the information processing terminal 10 to output additional information on the basis of the delivery information indicating a shipped state of the product, for example. In this case, the user is able to view the additional information at the timing when the product is shipped. For this reason, for example, in the case in which the above additional information is recipe information about the product or information related to necessary preparation for using the product, the user is able to make preparations, such as by purchasing necessary ingredients, by the time the product arrives.

In addition, the output control unit 230 according to the present embodiment may also cause additional information to be output on the basis of the completed delivery of the product. In other words, the output control unit 230 is able to cause the information processing terminal 10 to output additional information on the basis of the delivery information indicating a delivered state of the product. In this case, the user is able to view additional information in a state in which the product is actually at hand, and is able to utilize the additional information effectively.

Additionally, the output control unit 230 according to the present embodiment may also control the output of the additional information on the basis of a result of learning by the learning unit 240. The output control unit 230 may also cause additional information to be output according to a trend of the user individually or a trend of a cluster to which the user belongs, on the basis of the above learning result.

Learning Unit 240

The learning unit 240 includes a function of learning a user trend and the like related to the viewing of additional information. For example, the learning unit 240 is able to learn a trend of products that the user likes to view, a time period of high viewing frequency, a type of additional information with a high viewing frequency, and the like. For example, the learning unit 240 is able to execute the above learning by a machine learning technique or statistical technique such as a support vector machine (SVM), a neural network, or a regression model.

Communication Unit 250

The communication unit 250 includes a function of communicating information with the information processing terminal 10, the content server 30, the purchase history DB 40, and the delivery history DB 50. Specifically, the communication unit 250 according to the present embodiment receives input information and sensor information from the information processing terminal 10, and transmits an output control signal generated by the output control unit 230 to the information processing terminal 10. Also, the communication unit 250 receives product purchase history information from the purchase history DB 40. Also, the communication unit 250 receives product delivery information from the delivery history DB 50. Also, the communication unit 250 receives additional information about a product or access information related to additional information from the content server 30.

The above describes an exemplary functional configuration of the information processing server 20 according to the present embodiment. Note that the functional configuration described above is merely one example, and the functional configuration of the information processing server 20 according to the present embodiment is not limited to such an example. As described above, all or part of the configuration provided in the information processing server 20 according to the present embodiment may also be realized as a function of the information processing terminal 10. Additionally, for example, part of the configuration provided in the information processing server 20 may also be realized as a function of a separate apparatus. For example, the speech processing unit 220 and the learning unit 240 may be realized as functions of separate apparatus different from the information processing server 20. The functional configuration of the information processing server 20 according to the present embodiment may be modified flexibly.

1.5. Exemplary Output Control of Additional Information

Next, an example of the control of the output of additional information by the output control unit 230 according to the present embodiment will be described while citing specific examples.

Output Control Based on Delivery Information

First, an example of output control based on delivery information according to the present embodiment will be described. As described above, the output control unit 230 according to the present embodiment may cause additional information to be output on the basis of delivery information acquired from the delivery history DB 50.

Figure 5:
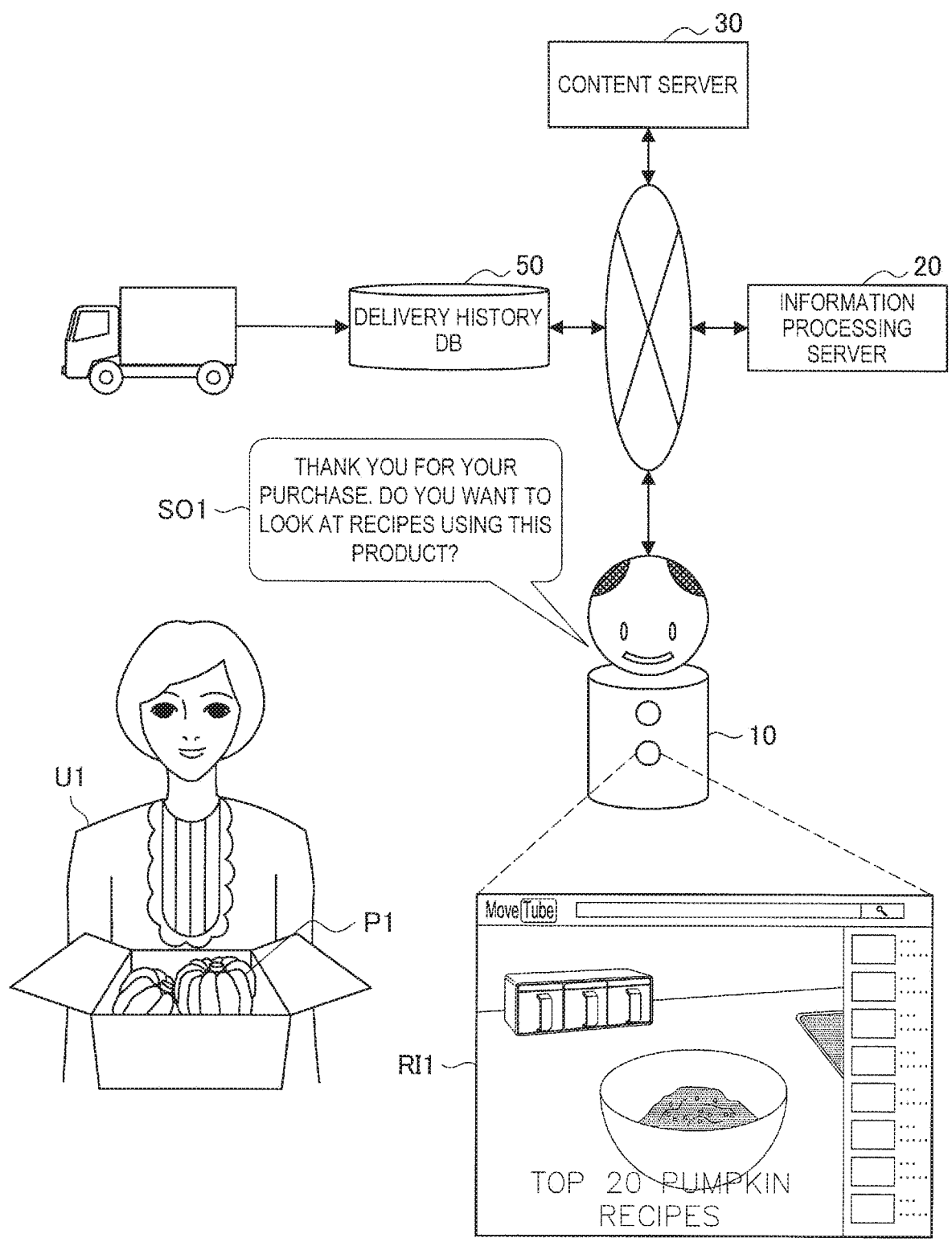
FIG. 5 is a diagram for explaining output control of additional information based on delivery information according to the embodiment.

FIG. 5 is a diagram for explaining output control of additional information based on delivery information according to the present embodiment. FIG. 5 illustrates a product P1 delivered to a user U1 by a delivery person, additional information RI1 output by the information processing terminal 10 on the basis of control by the output control unit 230, and speech output SO1 output together with the additional information RI1. As illustrated in FIG. 5, the output control unit 230 according to the present embodiment is able to cause the information processing terminal 10 to output the additional information RI1 and the speech output SO1 on the basis of the delivery information indicating a delivered state of the product P1. In this case, the delivery information stored in the delivery history DB 50 may be updated successively from a terminal or the like carried by the delivery person. For example, the output control unit 230 preferably causes the additional information RI1 and the speech output SO1 to be output on the basis of the delivery information related to the product P1 being updated to a delivered state by the delivery person. Also, for example, the delivery information may be updated on the basis of information transmitted from a delivery box or the like that includes a communication function. In this case, for example, the delivery information may be updated to a delivered state on the basis of receiving, from the delivery box, information indicating that the product has been placed inside the delivery box or information indicating that the product has been retrieved from the delivery box.

Specifically, the output control unit 230 may acquire the additional information RI1 related to the product P1 from the content server 30, and generate an output control signal including the additional information. Also, the output control unit 230 may transmit an output control signal including access information related to the additional information RI1. The information processing terminal 10 is able to output the additional information RI1 on the basis of the received output control signal.

Note that the example of FIG. 5 illustrates a case in which the product P1 is pumpkins and the additional information RI1 is recipe information using pumpkins, or in other words utilization information, but the additional information according to the present embodiment preferably includes advertising information in addition to utilization information. For example, the information processing terminal 10 according to the present embodiment may output additional information promoting a different related product or a regular purchase of pumpkins.

Output Control Based on User Recognition

Next, an example of output control based on user recognition according to the present embodiment will be described. As described above, the output control unit 230 according to the present embodiment preferably causes additional information to be output on the basis of the user being recognized by the recognition unit 210.

Figure 6:
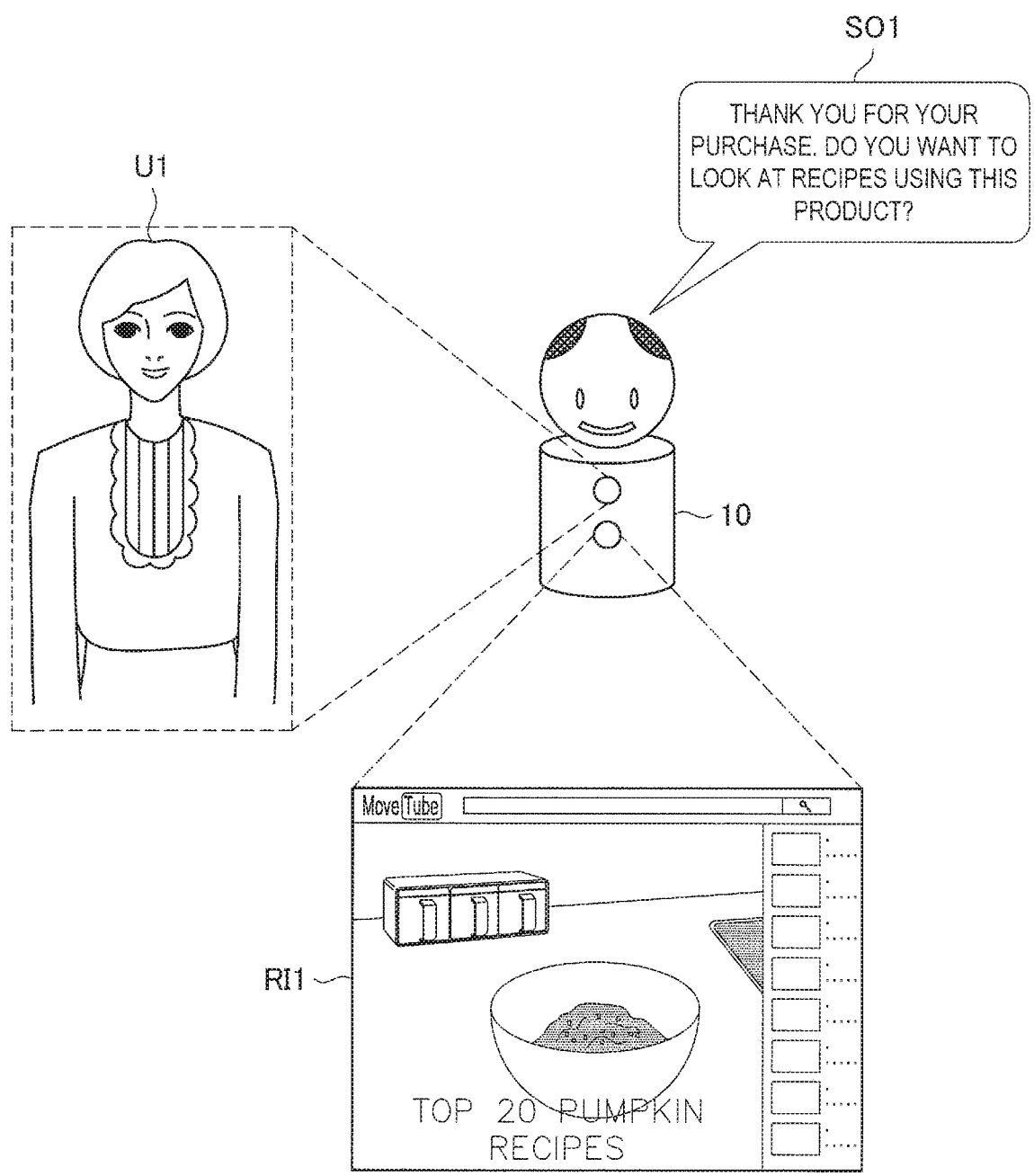
FIG. 6 is a diagram for explaining output control of additional information based on a user presence detection according to the embodiment.

At this time, for example, the output control unit 230 may cause additional information to be output on the basis of the recognition unit 210 detecting the presence of the user. FIG. 6 is a diagram for explaining output control of additional information based on a user presence detection according to the present embodiment. FIG. 6 illustrates the user U1 detected on the basis of sensor information collected by the sensor unit 120 of the information processing terminal 10, and the additional information RI1 output on the basis of the detection. According to the above function included in the output control unit 230 according to the present embodiment, a situation in which additional information is output when the user is not present or the like may be avoided, making it possible for the user to view the additional information reliably.

Note that the recognition unit 210 is able to detect the presence of the user from collected infrared sensor information, image information, speech information, and the like, for example. Also, in the case in which some or all of the functions of the sensor unit 120 of the information processing terminal 10 are realized by a separate apparatus, the recognition unit 210 may acquire GPS information or the like from a smartphone or the like carried by the user, and by comparing against pre-stored position information about one's home or the like, detect that the user is at home (the installation location of the information processing terminal 10), for example. In addition, for example, the recognition unit 210 may detect the whereabouts of the user on the basis of the strength of a Bluetooth Low Energy (BLE) signal emitted from a smartphone as above, a beacon, or the like. Additionally, it is also possible for the recognition unit 210 to acquire schedule information and the like input by the user, and estimate the whereabouts of the user on the basis of the schedule information.

Figure 7:
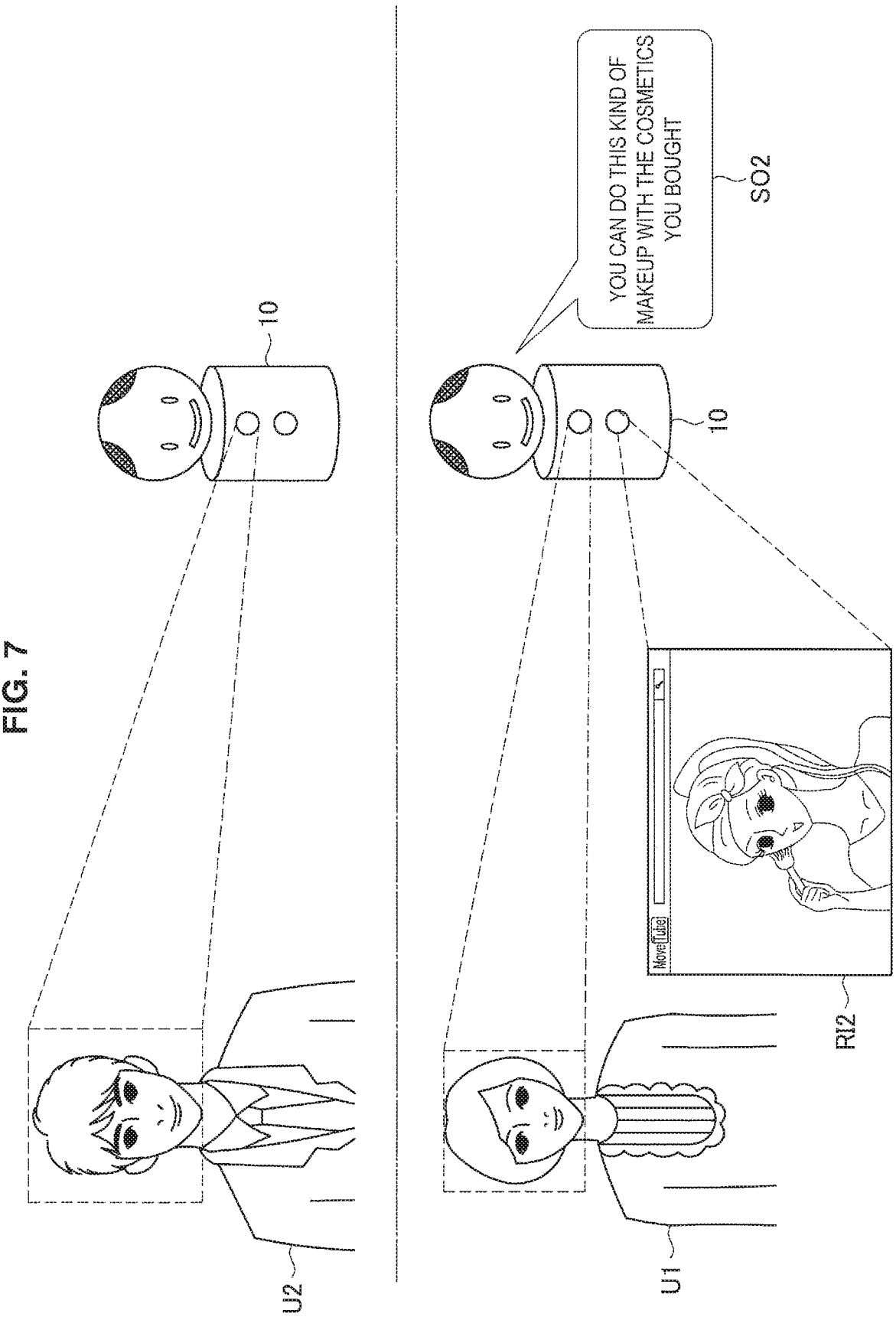
FIG. 7 is a diagram for explaining an output of additional information based on a recognition of an anticipated user according to the embodiment.

Also, for example, the output control unit 230 according to the present embodiment may cause additional to be output on the basis of the user recognized by the recognition unit 210 corresponding to an anticipated user of the product. FIG. 6 is a diagram for explaining an output of additional information based on a recognition of an anticipated user according to the present embodiment. Herein, the upper part of FIG. 7 illustrates a user U2 recognized by the recognition unit 210, while the lower part of FIG. 7 illustrates the user U1 recognized by the recognition unit 210. At this point, as illustrated in FIG. 7, the output control unit 230 is able to control the information processing terminal 10 such that additional information RI2 and speech output SO2 is output only to the user U1 who is the anticipated user of the product, while the additional information RI2 and the speech output SO2 is not output to the user U2 who does not correspond to an anticipated user of the product. Note that FIG. 7 illustrates an example of a case in which the product is cosmetics such as lipstick and blush, and the additional information RI2 is a video explaining a makeup technique using the cosmetics.

At this point, the output control unit 230 according to the present embodiment is able to estimate the anticipated user of the product on the basis of purchase history information acquired from the purchase history DB 40. For example, the output control unit 230 according to the present embodiment may estimate the anticipated user of the product on the basis of purchaser information included in the purchase history information. FIG. 8 is a diagram illustrating one example of purchase history information and delivery history information referenced by the output control unit 230. Referring to FIG. 8, it is demonstrated that the output control unit 230 acquires information such as a product name, a purchaser, a purchase date, a purchase count, and a target from the purchase history DB 40, for example. In the case of the example illustrated in FIG. 8, since the user who has purchased lipstick and blush is the user U1, the output control unit 230 is able to estimate that the anticipated user of the product is the user U1.

On the other hand, the output control unit 230 may also estimate the anticipated user on the basis of target information and the like about the product. For instance, the example in FIG. 8 illustrates that the user who has purchased a necktie is the user U1, but if the target information is referenced, it is understood that the target of the product is men. In this case, on the basis of the above target information, the output control unit 230 is able to estimate that the anticipated user of the necktie is the user U2. Note that the target information according to the present embodiment may be information set by the manufacturer or distributor of the product, or may be information set by a result of learning by the learning unit 240, for example.

Figure 9:
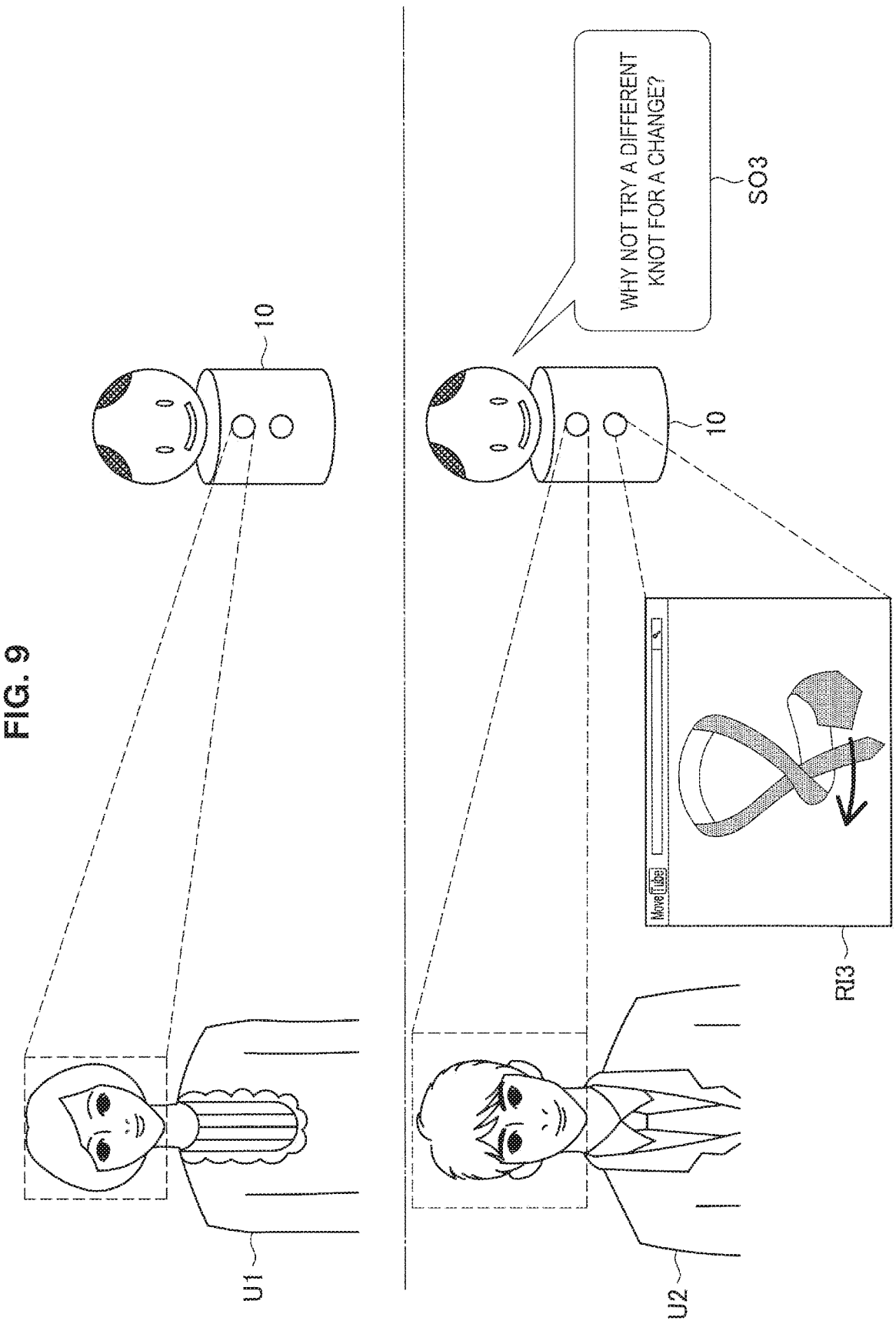
FIG. 9 is a diagram illustrating exemplary output of additional information with respect to an anticipated user estimated on the basis of target information according to the embodiment.

FIG. 9 is a diagram illustrating exemplary output of additional information with respect to an anticipated user estimated on the basis of target information. The upper part of FIG. 9 illustrates the user U1 recognized by the recognition unit 210, while the lower part of FIG. 9 illustrates the user U2 recognized by the recognition unit 210. At this point, the output control unit 230 controls the information processing terminal 10 such that additional information RI3 and speech output SO3 is output only to the user U2 estimated to be the anticipated user. Note that FIG. 9 illustrates an example of a case in which the product is a necktie, and the additional information RI3 is a video explaining how to tie the necktie.

The above describes output control based on user recognition according to the present embodiment. According to the above function included in the output control unit 230 according to the present embodiment, it becomes possible to provide additional information about a product to an effective recipient at a more effective timing.

Output Control Based on Purchase History Information

Next, an example of output control based on purchase history information according to the present embodiment will be described. The output control unit 230 according to the present embodiment is able to control the output of additional information on the basis of purchase history information about a product. At this point, the output control unit 230 preferably controls the additional information to be output on the basis of various information included in the purchase history information. For example, the output control unit 230 according to the present embodiment is able to cause additional information corresponding to a combination of products possessed by the user to be output on the basis of the purchase history information.

For example, referring to the purchase history information illustrated in FIG. 8, it is demonstrated that the user U1 has purchased beef, rice, eggs, and pumpkin in the past. In this case, the output control unit 230 according to the present embodiment is able to cause a recipe for a dish that can be realized by the above combination of products to be output. Additionally, at this point, the output control unit 230 may also prioritize the output of additional information related to a combination of products that are packaged and shipped together, for example.

Figure 10:
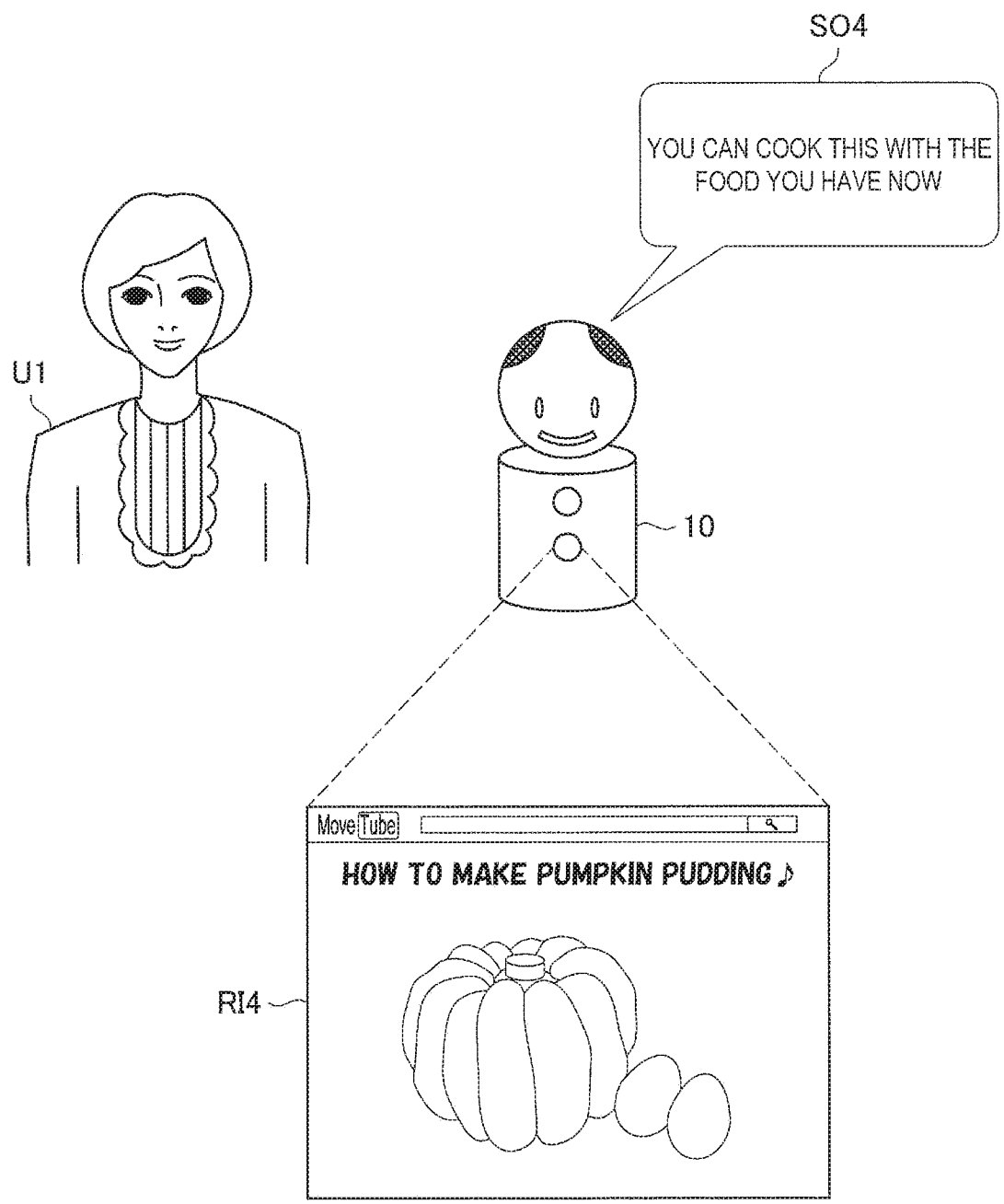
FIG. 10 is a diagram for explaining an output of additional information corresponding to a combination of products according to the embodiment.

FIG. 10 is a diagram for explaining an output of additional information corresponding to a combination of products according to the present embodiment. FIG. 10 illustrates the user U1, and additional information RI4 and speech output SO4 output by the information processing terminal 10. The example illustrated in FIG. 10 illustrates an example of a case in which the additional information RI4 is a recipe for a dish that can be realized by a combination of eggs and pumpkin owned by the user. As illustrated in FIG. 10, by having the output control unit 230 cause additional information corresponding to a combination of products possessed by the user to be output, it becomes possible to provide information of higher usefulness to the user.

In addition, the output control unit 230 according to the present embodiment is also able to estimate the state of a product on the basis of purchase history information or delivery information, and cause additional information to be output according to the state of the product. For example, in the example illustrated in FIG. 8, the beef purchased by the user on August 1 is delivered on August 3. At this point, for example, in the case in which the current date is September 15, from the above purchase date or delivery date and the expiration date of beef, the output control unit 230 is able to estimate that the beef already has been consumed by the user, or is already in an unusable state for cooking. In this case, the output control unit 230 may cause additional information related to beef not to be output.

Figure 11:
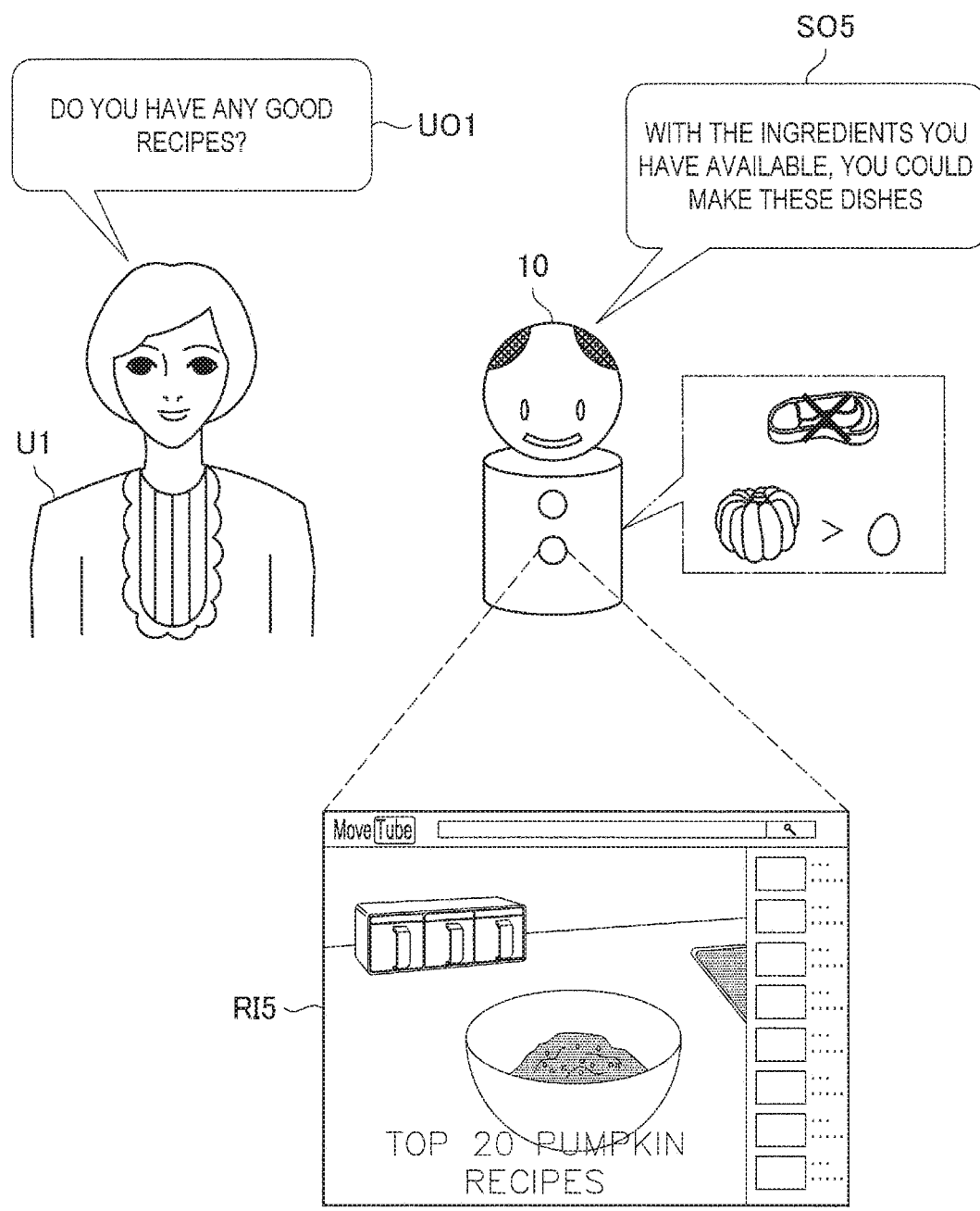
FIG. 11 is a diagram for explaining output control based on purchase history information according to the embodiment.

FIG. 11 is a diagram for explaining output control based on purchase history information according to the present embodiment. FIG. 11 illustrates the user U1, and additional information RI5 and speech output SO5 output by the information processing terminal 10. The example illustrated in FIG. 11 illustrates an example of a case in which the additional information RI5 is recipes of dishes using pumpkin. In other words, in the example illustrated in FIG. 11, the output control unit 230 causes additional information related to beef not to be output. Note that in the case of the example illustrated in FIG. 11, the information processing terminal 10 outputs the additional information RI5 and the speech output SO5 on the basis of an utterance UO1 by the user U1. In this way, the output control unit 230 according to the present embodiment may also cause additional information to be output on the basis of a request for information by the user being recognized.

Also, FIG. 11 describes an example of a case in which the output control unit 230 causes additional information related to an expired product not to be output, by the output control unit 230 according to the present embodiment is also able to prioritize the output of additional information related to a product whose expiration date is estimated to be soon. Furthermore, for example, the output control unit 230 is also able to cause additional information introducing a method of repurposing an expired food ingredient for cleaning or the like to be output. According to the above function included in the output control unit 230, it becomes possible to provide appropriate additional information depending on the state of the product to the user, and an effect of improving the user's viewing motivation is also expected.

In addition, the output control unit 230 according to the present embodiment may also control an output priority of additional information on the basis of the purchase count of a product. For example, the output control unit 230 may set a high output priority for additional information about a product whose purchase count is less than a predetermined count. In the case of a low purchase count of a product, particularly in the case in which the product is purchased for the first time, it is anticipated that the user will not be familiar with methods of utilizing the product. For this reason, by setting a high output priority for additional information related to a product with a low purchase count, the output control unit 230 according to the present embodiment is able to prioritize the output of information that is more valuable to the user. In the example illustrated in FIG. 8, the output control unit 230 sets a high output priority for products with a purchase count of 1.

Also, for example, the output control unit 230 may set a low output priority for additional information about a product whose purchase count is a predetermined count or greater. In the case of a high purchase count of a product, it is anticipated that the user has fully grasped methods of utilizing the product. For this reason, by setting a low output priority for additional information related to a product with a high purchase count, the output control unit 230 according to the present embodiment is able to not prioritize the output of additional information that the user possibly has grasped already. In the example illustrated in FIG. 8, the output control unit 230 sets a low output priority for products with a purchase count of 5 or more.

Note that FIG. 11 illustrates an example of a case in which the output control unit 230 according to the present embodiment is causing the information processing terminal 10 to output additional information RI5 related to pumpkins with a higher output priority than eggs.

Output Control Based on Context Information

Next, output control based on context information according to the present embodiment will be described. The output control unit 230 according to the present embodiment is able to control the output of additional information on the basis of context information. Herein, context information according to the present embodiment may be any of various types of information related to the situation when the additional information is output. The context information according to the present embodiment preferably includes information related to the date and time, the season, the weather, the temperature, the humidity, an event, the user's schedule, and the like, for example. The context information according to the present embodiment may be information input by the user via the input unit 110 of the information processing terminal 10, and may also be information collected by the sensor unit 120. Additionally, for example, the context information may also be information acquired from any of various services provided over a network or the like.

Figure 12:
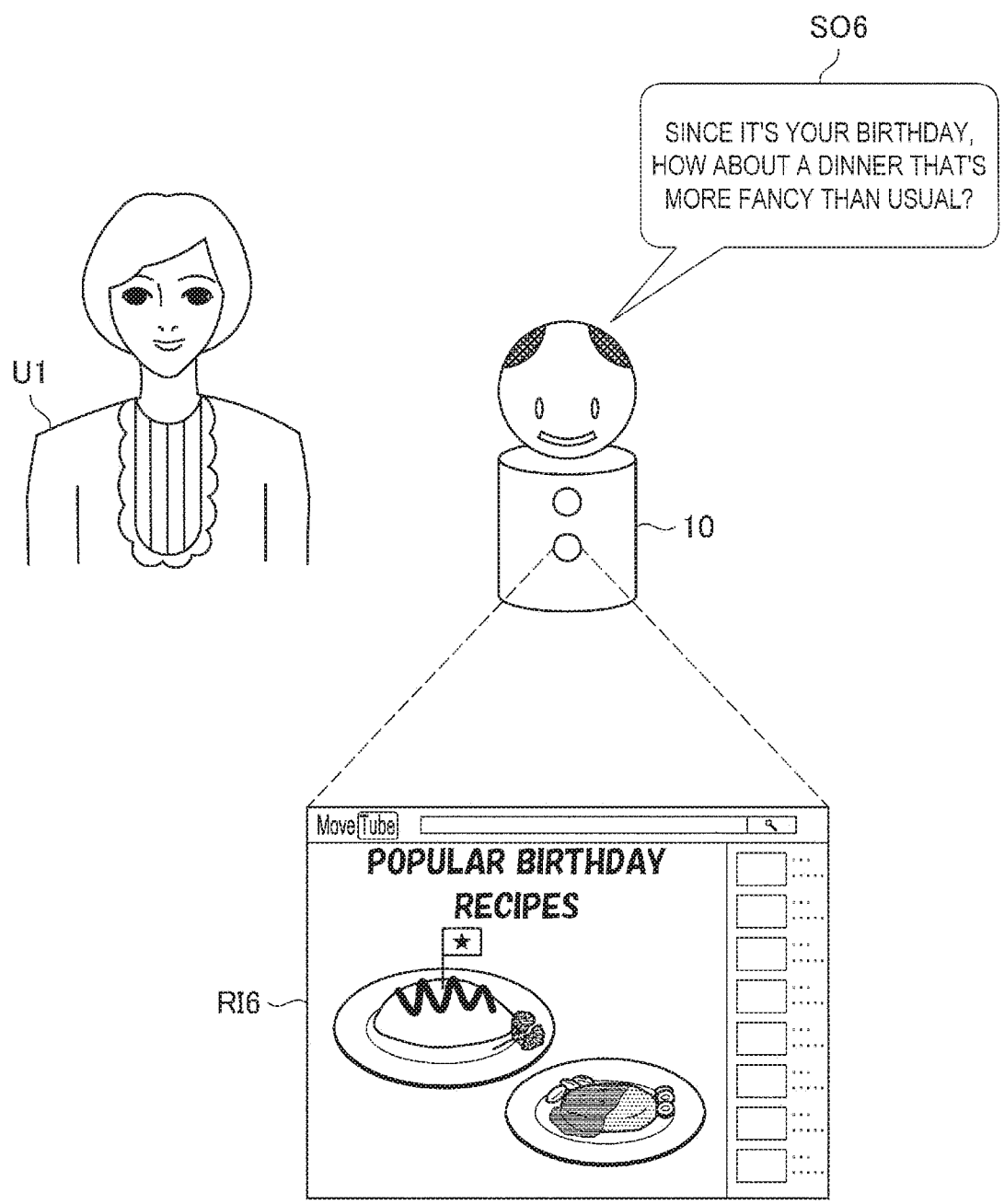
FIG. 12 is a diagram for explaining output control based on context information according to the embodiment.

FIG. 12 is a diagram for explaining output control based on context information according to the present embodiment. FIG. 12 illustrates the user U1, and additional information RI6 and speech output SO6 output by the information processing terminal 10. Herein, the additional information RI6 preferably is a recipe for a dish offered on a birthday or the like. For example, the output control unit 230 is able to recognize a birthday of the user U1 of a family member of the user U1 on the basis of context information acquired from a schedule application or the like, and cause the information processing terminal 10 to output the additional information RI6 related to the birthday.

In this way, by having the output control unit 230 according to the present embodiment perform output control based on context information, it becomes possible to provide the user with more valuable additional information according to the anticipated needs of the user. Note that in FIG. 11, a case in which the context information is information related to a schedule or event is described as an example, but the output control unit 230 may also cause additional information to be output before dinnertime or the like on the basis of time information, for example. Additionally, the output control unit 230 may also execute control such as causing a recipe for a hot meal on a cold day to be output as additional information on the basis of temperature information.

Output Control Based on Purchase Origin Information

Next, output control based on purchase origin information according to the present embodiment will be described. The output control unit 230 according to the present embodiment is able to control the output of additional information on the basis of purchase origin information when a product is purchased. Herein, purchase origin information according to the present embodiment preferably is information indicating the catalyst for purchasing a product. The purchase origin information according to the present embodiment preferably includes advertising information, referrer link information, or the like that acted as a catalyst for visiting the EC site, for example. At this point, by causing information such as "the user was browsing this information before making a purchase" together with the additional information to be output by a UI display or the like, the output control unit 230 may execute control such as arousing user interest in the output of the additional information on the basis of the purchase origin information. Note that, besides a notification by the above UI display, the output control unit 230 may also issue a notification by speech. Furthermore, the output control unit 230 may also prioritize the output of additional information based on purchase origin information.

Figure 13:
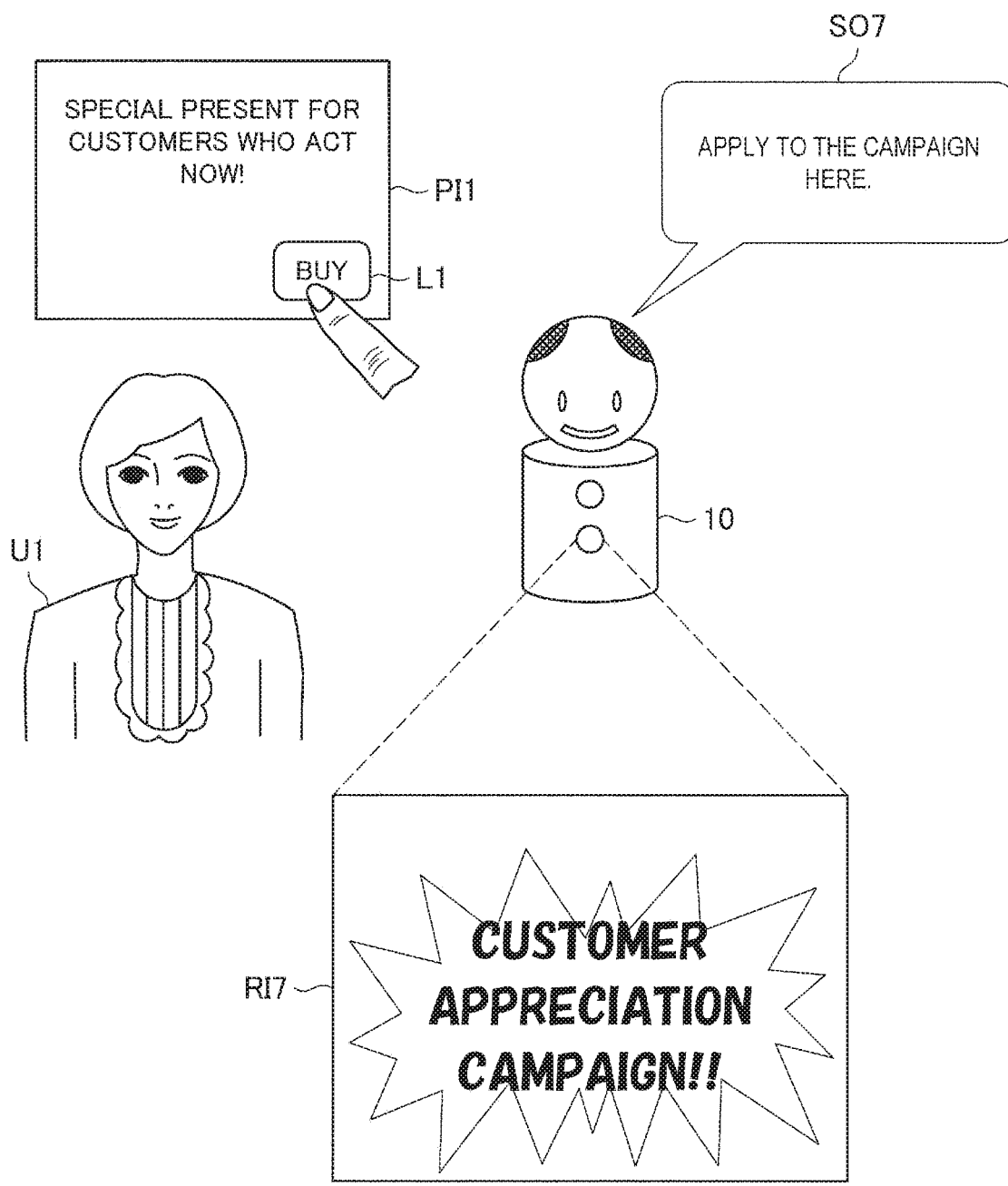
FIG. 13 is a diagram for explaining output control based on purchase origin information according to the embodiment.

FIG. 13 is a diagram for explaining output control based on purchase origin information according to the present embodiment. FIG. 13 illustrates the user U1, purchase origin information PI1, and additional information RI7 and speech output SO7 output by the information processing terminal 10. Herein, the purchase origin information PI1 in FIG. 13 preferably is advertising information, for example. In other words, FIG. 13 illustrates an example of a case in which the user U1 has viewed the purchase origin information PI1, moved to the EC site from a link L1, and purchased a product. In this case, as illustrated in FIG. 13, the output control unit 230 according to the present embodiment preferably causes the information processing terminal 10 to output additional information RI7 which is corresponding campaign information on the basis of the purchase origin information PI1.

Additionally, for example, the output control unit 230 is also capable of specifying a URL related to a video of a recipe that the user had been viewing before purchasing a product from a browsing history, and causing the video to be output as additional information after the product arrives. According to the above function included in the output control unit 230 according to the present embodiment, it becomes possible to provide the user with additional information related to information that acted as a catalyst for making a purchase, and an effect of improving user satisfaction is expected.

Other Examples of Output Control

The above describes the control of the output of additional information according to the present embodiment while giving specific examples. Note that the output control unit 230 according to the present embodiment is not limited to the control examples given above, and preferably executes output control based on a variety of information. For example, the output control unit 230 may also select the additional information to output on the basis of a ranking related to the number of views or the usefulness of the additional information. In this case, the output control unit 230 is able to prioritize the output of additional information that is ranked highly in the above ranking. Additionally, for additional information that the user has viewed or blocked from viewing in the past, the output control unit 230 is also able to cause such additional information not to be output in the future. In addition, the output control unit 230 may also prioritize the output of newly added additional information.

Also, the above describes as an example a case in which the product mainly is a food ingredient and the additional information is a recipe, but the combination of the product and the additional information according to the present embodiment is not limited to such an example. The product according to the present embodiment may be any of various types of products distributed commercially. The product according to the present embodiment preferably includes food ingredients, electric appliances, clothing, medicine, pet supplies, drinks such as tea and coffee, cosmetics, and the like, for example.

For example, in the case in which the product is a food ingredient, the output control unit 230 is able to cause a recipe related to the food ingredient, a method of preparation, a storage method, expiration date information, a utilization method other than cooking, and the like to be output as the additional information.

In addition, in the case in which the product is an electric appliance, the output control unit 230 is able to cause a manual for the electric appliance, a setup method, troubleshooting, instructions about signing up for member registration or a product warranty, and the like to be output as the additional information.

Also, in the case in which the product is clothing, the output control unit 230 is able to cause information about wearing the clothing stylishly, information about coordinating with other articles owned by the user, care and maintenance methods, and the like to be output as the additional information.

Also, in the case in which the product is medicine, the output control unit 230 is able to cause directions for taking the medicine, information about taking multiple medications together, a storage method, side effect information, methods of dealing with an emergency, and the like to be output as the additional information.

Also, in the case in which the product is pet supplies such as pet food, the output control unit 230 is able to cause a feeding method, a storage method, information about a veterinary clinic, and the like to be output as the additional information.

Also, in the case in which the product is drinks such as tea or coffee, the output control unit 230 is able to cause a preparation method, a storage method, a recipe for use in cooking, information about medicinal benefits and effects, and the like to be output as the additional information.

Also, in the case in which the product is cosmetics, the output control unit 230 is able to cause a makeup method, a storage method, and the like to be output as the additional information.

The above cites examples of combinations of products and additional information according to the present embodiment. Note that, besides the examples given above, the additional information according to the present embodiment may also be advertising information or campaign information related to a product. Additionally, the additional information may also be information introducing a community or the like of users who use the same product. Additionally, the additional information may also be information encouraging the user to review the product. The additional information according to the present embodiment may be any of various types of information related to the product.

1.6. Management and Personalization of Additional Information

Next, the management and among individuals of additional information according to the present embodiment will be described. As described above, the output control unit 230 according to the present embodiment is able to control the output of additional information on the basis of various information. At this time, the output control unit 230 may generate a list of additional information acting as output candidates, and execute control enabling the user to check and edit the list. For example, the output control unit 230 is able to cause the above generated list to be displayed on a private user page on the EC site, or cause the information processing terminal 10 to output the above generated list. Also, for example, the output control unit 230 is able to cause additional information on the above list to be output on the basis of an utterance or the like by the user.

At this point, first, the output control unit 230 may manage each product purchased by the user in association with additional information found in a search by a priority common to all users. According to the above function included in the output control unit 230, for example, on a personal page of the EC site, the user is able to view the products that one has purchased (or is considering purchasing) and additional information related to the products as a list.

In addition, the output control unit 230 may also generate a list of additional information and control a display related to the list on the basis of product categories or the like. In this case, for example, it becomes possible to provide the user with a list of additional information with better visibility categorized into "My Recipes", "My Coordinates", "My Manuals", and the like.

Also, the list of additional information according to the present embodiment preferably is designed to enable personalization for each user. For example, the user preferable is able to add or remove any additional information with respect to the list of additional information generated by the output control unit 230. In addition, the user may also be able to change the order of the additional information displayed in the list. In this way, by providing a function of editing the list of additional information by the user, for example, when the user makes a request for information such as "Show me curry recipes" or "Show me the washing machine manual", it becomes possible to cause the information processing terminal 10 to output additional information that better corresponds to the user's wishes or additional information of higher importance. Also, the list of additional information edited by the user may be designed to be referable by other users. In this case, for example, the user is also able to move to the page of a different user who has registered the same additional information as additional information that oneself has registered, and search for further additional information of interest.

Additionally, the above personalization is not limited only to editing by the user, and may also be realized by a function of the information processing server 20. For example, from the purchase origin information, the output control unit 230 is also able to acquire a keyword searched for when the user purchased a product on the EC site, and utilize the acquired keyword as a search keyword when generating a list of additional information. According to the above function included in the output control unit 230, it becomes possible to generate a list of additional information that is more valuable to the user. Additionally, for example, the output control unit 230 is also able to control the display order of additional information on the list on the basis of context information such as the season. According to this function, it becomes possible to provide additional information that better conforms to the user's daily life.

Additionally, the output control unit 230 according to the present embodiment may also generate a list of additional information on the basis of user characteristics learned by the learning unit 240. For example, the output control unit 230 may also generate a list of additional information on the basis of user preferences, family structure, and the like learned by the learning unit 240. For example, the output control unit 230 may generate a list of recipes on the basis of the user's preference for rich-tasting food, and may also prioritize the inclusion of recipes for two people on the list on the basis of the user living with another person as a couple. Note that the learning unit 240 may learn user characteristics like the above from edits to the list by the user, a search history on the EC site or in a browser, a history of which additional information was actually viewed, user utterances, and the like, for example.

In addition, the personalization of the additional information by the output control unit 230 according to the present embodiment may be performed not only when generating the list, but also when outputting information. For example, in the case in which a recipe for four people exists on the list, the output control unit 230 is also able to recalculate the ingredient quantities and the like in the recipe for two people, and cause speech information and the like to be output. Similarly, the output control unit 230 is also able to adjust and output the quantities of seasonings and the like to match the user's taste preferences. Furthermore, the output control unit 230 is also able to partially correct the content of the recipe to match a wattage supported by a microwave oven owned by the user, and present the corrected content to the user, for example.

Note that in the case in which learning data related to user characteristics like the above does not exist, the output control unit 230 preferably encourages the user to provide necessary information for personalization by causing the information processing terminal 10 to output questions such as "How many people are you cooking for?" and "How many watts does your microwave oven output?". According to the above functions included in the learning unit 240 and the output control unit 230 according to the present embodiment, it becomes possible to provide the user with additional information of high value corresponding to the user's personal characteristics. Also, for example, the user is able to visually or aurally confirm additional information such as a recipe while also engaging in dialogue with the information processing terminal 10 and using a timer function or the like, and the work efficiency while cooking or the like may be improved greatly.

1.7. Flow of Operations of Information Processing Server 20

Figure 14:
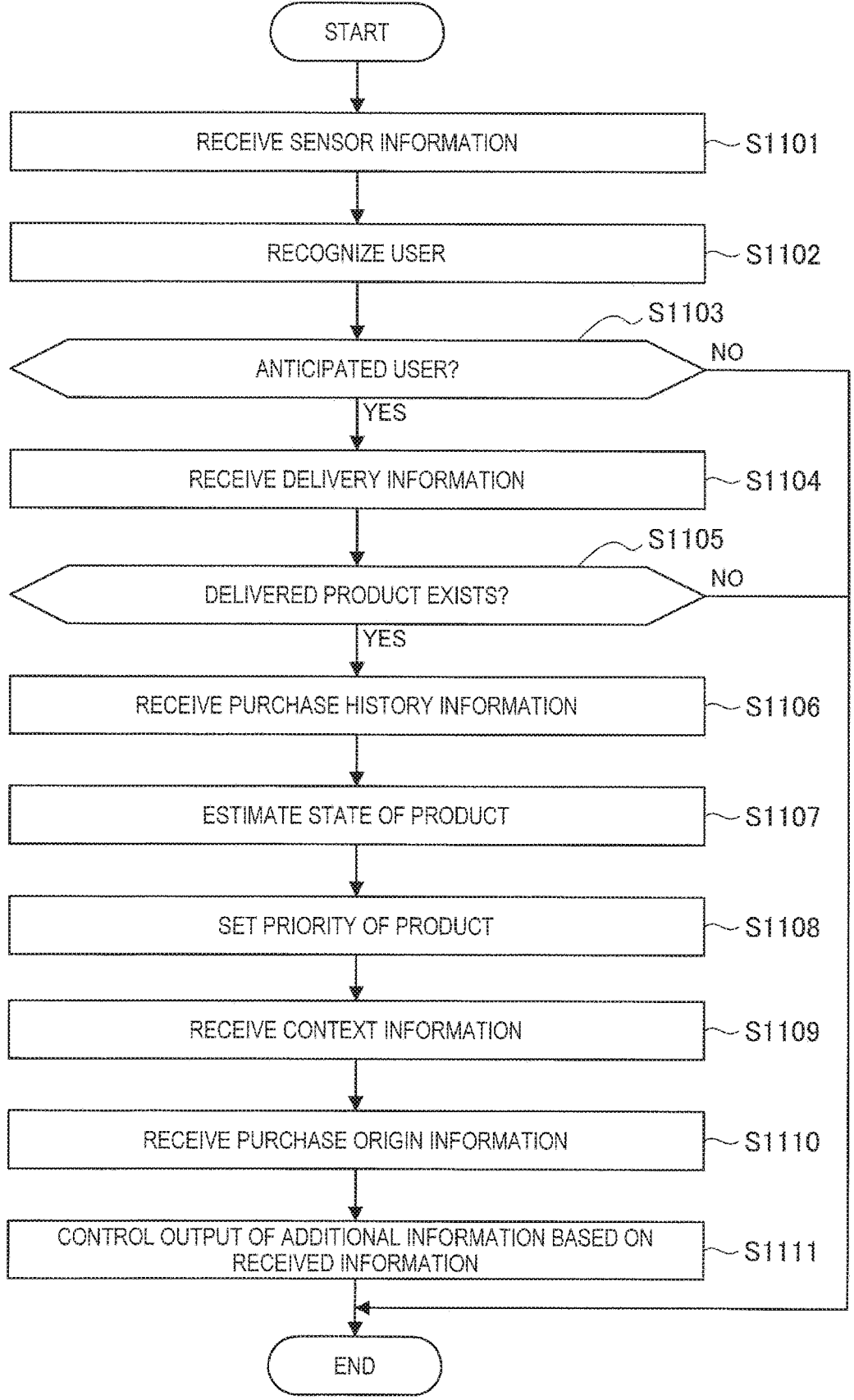
FIG. 14 is a flowchart illustrating a flow of operations of an information processing server according to the embodiment.

Next, a flow of operations of the information processing server 20 according to the present embodiment will be described. FIG. 14 is a flowchart illustrating a flow of operations of the information processing server 20. Note that the following describes a case in which the information processing server 20 causes additional information to be output on the basis of the completed delivery of a product and the recognized user being the anticipated user as an example.

Referring to FIG. 14, first, the communication unit 250 of the information processing server 20 receives sensor information from the information processing terminal 10 (S1101).

Next, the recognition unit 210 recognizes the user on the basis of the sensor information received in step S1101 (S1102).

At this point, in the case in which the recognized user is not the anticipated user (S1103: NO), the information processing server 20 enters a standby state.

On the other hand, in the case in which the recognized user is the anticipated user (S1103: YES), the communication unit 250 receives delivery information from the delivery history DB 50 (S1104).

At this point, in the case in which a product whose delivery is complete does not exist within a predetermined period (S1105: NO), the information processing server 20 enters the standby state.

On the other hand, in the case in which a product whose delivery is complete exists within a predetermined period (S1105: YES), the communication unit 250 receives purchase history information from the purchase history DB 40 (S1106).

Next, the output control unit 230 estimates the state of the product on the basis of the purchase history information received in step S1106 and the delivery information received in step S1104 (S1107).

Next, the output control unit 230 sets an output priority of additional information related to the product on the basis of the purchase history information received in step S1106 and the delivery information received in step S1104 (S1108).

Next, the communication unit 250 receives context information from the information processing terminal 10 and the like (S1109).

Next, the communication unit 250 receives purchase origin information from the information processing terminal 10 and the like (S1110).

Next, the output control unit 230 controls the output of additional information based on each piece of received information (S1111), and enters the standby state.

2. HARDWARE CONFIGURATION EXAMPLE

Figure 15:
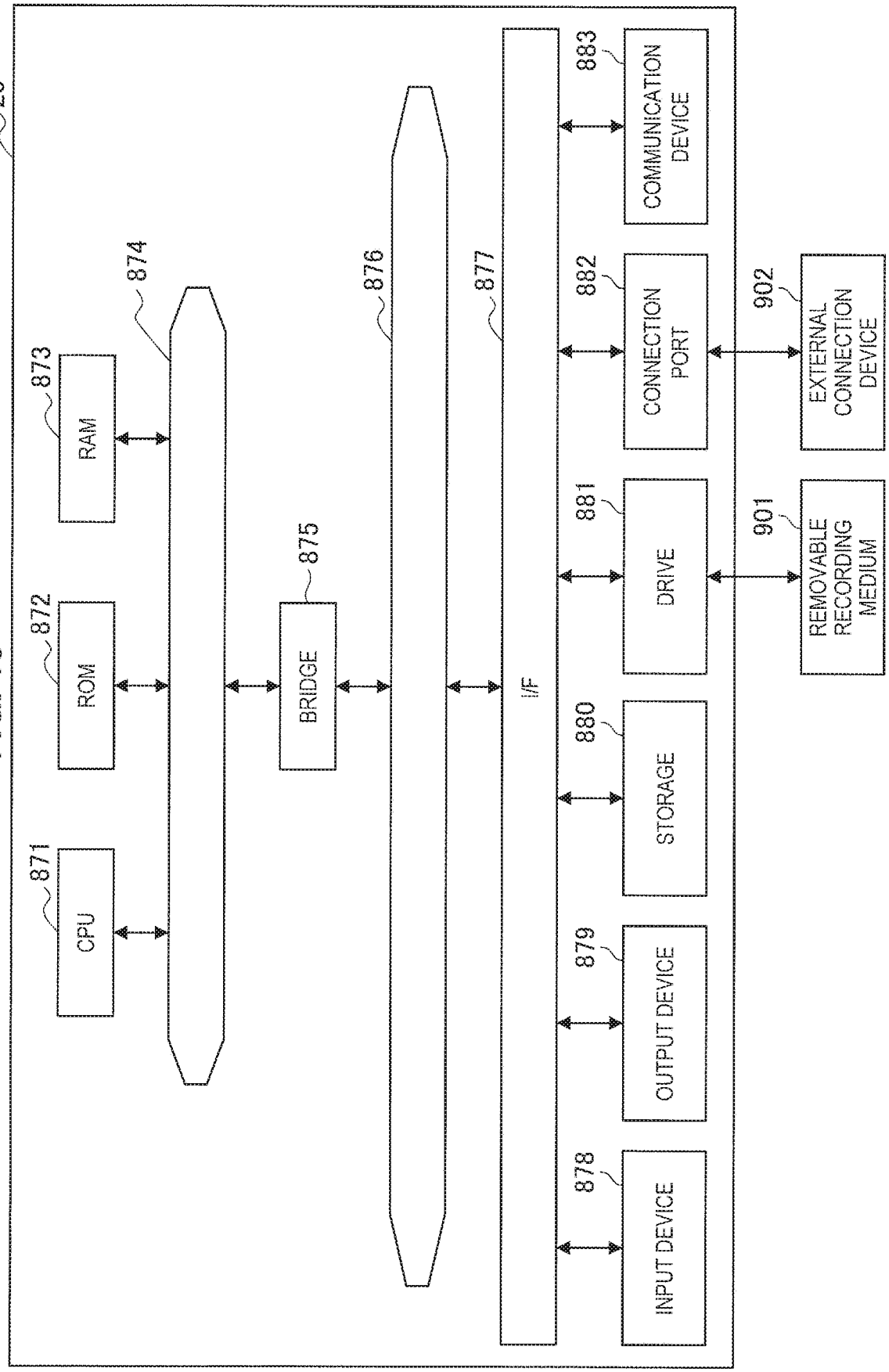
FIG. 15 is an exemplary hardware configuration according to the present disclosure.

Next, a hardware configuration example common to the information processing terminal 10 and the information processing server 20 according to the present disclosure will be described. FIG. 15 is a block diagram illustrating a hardware configuration example of the information processing terminal 10 and the information processing server 20 according to the present disclosure. Referring to FIG. 15, the information processing terminal 10 and the information processing server 20 each include a central processing unit (CPU) 871, a read-only memory (ROM) 872, a random access memory (RAM) 873, a host bus 874, a bridge 875, an external bus 876, an interface 877, an input device 878, an output device 879, a storage 880, a drive 881, a connection port 882, and a communication device 883, for example. Note that the hardware configuration illustrated here is an example, and a part of structural elements may be omitted. In addition, structural elements other than the structural elements illustrated here may be further included.

CPU 871

The CPU 871 functions as, in one example, an arithmetic processing unit or a control unit, and controls the overall operation of each component or a part thereof on the basis of various programs recorded in the ROM 872, the RAM 873, the storage 880, or a removable recording medium 901.

ROM 872 and RAM 873

The ROM 872 is a means for storing programs to be fetched by the CPU 871, data used for calculation, or the like. The RAM 873 temporarily or permanently stores, in one example, programs to be fetched by the CPU 871, various parameters appropriately changing at the time of executing the program, or the like.

Host Bus 874, Bridge 875, External Bus 876, and Interface 877

The CPU 871, the ROM 872, and the RAM 873 are mutually connected via, in one example, the host bus 874 capable of high-speed data transmission. On the other hand, the host bus 874 is connected to the external bus 876 having a relatively low data transmission speed via, in one example, the bridge 875. In addition, the external bus 876 is connected to various components via the interface 877.

Input Device 878

Examples of the input device 878 include a mouse, a keyboard, a touch panel, a button, a switch, a lever, and the like. Further example of the input device 878 includes a remote controller capable of transmitting a control signal using infrared rays or other radio waves (hereinafter referred to as a remote controller). Additionally, the input device 878 includes a speech input device such as a microphone.

Output Device 879

The output device 879 is a device capable of notifying visually or audibly the user of the acquired information, and examples thereof include a display device such as cathode ray tubes (CRTs), LCDs, or organic ELs, an audio output device such as speakers or headphones, a printer, a mobile phone, a facsimile, and the like.

Storage 880

The storage 880 is a device for storing various types of data. Examples of the storage 880 include a magnetic storage device such as hard disk drives (HDDs), a semiconductor storage device, an optical storage device, a magneto-optical storage device, and the like.

Drive 881

The drive 881 is a device that reads out information recorded on the removable recording medium 901 such as a magnetic disk, an optical disk, a magneto-optical disk, or a semiconductor memory or writes information to the removable recording medium 901.

Removable Recording Medium 901

The removable recording medium 901 is, in one example, a DVD medium, a Blu-ray (registered trademark) medium, an HD DVD medium, various kinds of semiconductor storage media, and the like. It may be apparent that the removable recording medium 901 may be, in one example, an IC card equipped with a contactless IC chip, an electronic device, or the like.

Connection Port 882

The connection port 882 is a port for connection with an external connection device 902, and examples thereof include a universal serial bus (USB) port, an IEEE 1394 port, a small computer system interface (SCSI), an RS-232C port, or an optical audio terminal.

External Connection Device 902

The external connection device 902 is, in one example, a printer, a portable music player, a digital camera, a digital video camera, an IC recorder, or the like.

Communication Device 883

The communication device 883 is a communication device for connecting to a network, and examples thereof include a communication card for wired or wireless LAN, Bluetooth (registered trademark), or wireless USB (WUSB), a router for optical communication, a router for asymmetric digital subscriber line (ADSL), or a modem for various communication.

3. CONCLUSION

As described above, the information processing server 20 according to the present disclosure is able to cause the information processing terminal 10 to output various additional information related to a product. At this time, the information processing server 20 according to the present disclosure is able to control the output of additional information on the basis of the delivery status of the product. Also, the information processing server 20 is able to cause the information processing terminal 10 to output additional information on the basis of a user being recognized. According to such a configuration, it becomes possible to provide additional information that is more useful to the user at a more effective timing.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Steps in processes executed by the information processing server 20 in this specification are not necessarily executed chronologically in the order described in a flow chart. For example, steps in processes executed by the information processing server 20 may be executed in a different order from the order described in a flow chart or may be executed in parallel.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:
an output control unit that controls an output of additional information related to a product purchased by a user, in which the output control unit controls an output of the additional information on the basis of delivery information about the product.

(2)

The information processing apparatus according to (1), further including:
a recognition unit that recognizes the user on the basis of collected sensor information, in which
the output control unit causes the additional information to be output on the basis of the user being recognized by the recognition unit.

(3)

The information processing apparatus according to (1) or (2), in which
the output control unit causes the additional information to be output on the basis of a delivery of the product being completed.

(4)

The information processing apparatus according to (2), in which
the output control unit causes the additional information to be output on the basis of the user recognized by the recognition unit corresponding to an anticipated user of the product.

(5)

The information processing apparatus according to (4), in which
the output control unit estimates the anticipated user on the basis of purchase history information about the product.

(6)

The information processing apparatus according to any of (1) to (5), in which
the output control unit controls an output of the additional information on the basis of purchase history information about the product.

(7)

The information processing apparatus according to (6), in which
the output control unit causes the additional information corresponding to a combination of the products possessed by the user to be output on the basis of the purchase history information about the products.

(8)

The information processing apparatus according to (6) or (7), in which
the output control unit estimates a state of the product on the basis of the purchase history information or the delivery information about the product, and causes the additional information to be output according to the state of the product.

(9)

The information processing apparatus according to any of (6) to (8), in which
the output control unit controls an output priority of the additional information on the basis of a purchase count of the product.

(10)

The information processing apparatus according to (9), in which the output control unit sets a high output priority for the additional information about a product whose purchase count is less than a predetermined count.

(11)

The information processing apparatus according to (9) or (10), in which the output control unit sets a low output priority for the additional information about a product whose purchase count is equal to or greater than a predetermined count.

(12)

The information processing apparatus according to any of (1) to (11), in which the output control unit controls an output of the additional information on the basis of context information.

(13)

The information processing apparatus according to any of (1) to (12), in which the output control unit controls an output of the additional information on the basis of purchase origin information when the product has been purchased.

(14)

The information processing apparatus according to any of (1) to (13), in which the additional information includes at least any of utilization information, advertising information, or campaign information related to the product.

(15)

The information processing apparatus according to any of (1) to (14), in which the output control unit causes the additional information to be output on the basis of a request for information by the user being recognized.

(16)

The information processing apparatus according to any of (1) to (15), further including:

an output unit that outputs the additional information on the basis of control by the output control unit.

(17)

The information processing apparatus according to any of (1) to (16), further including:

a sensor unit that collects sensor information related to the user or the product.

(18)

The information processing apparatus according to any of (1) to (17), further including:

a speech processing unit that executes speech recognition on the basis of collected utterance information.

(19)

An information processing method that is executed by a processor, the information processing method including:

controlling an output of additional information related to a product purchased by a user, in which the controlling of an output includes controlling an output of the additional information on the basis of delivery information about the product.

(20)

A program for causing a computer to function as an information processing apparatus including:

an output control unit that controls an output of additional information related to a product purchased by a user, in which the output control unit controls an output of the additional information on the basis of delivery information about the product.

REFERENCE SIGNS LIST

10 information processing terminal
110 input unit
120 sensor unit
130 output unit
140 server communication unit
20 information processing server
210 recognition unit
220 speech processing unit
230 output control unit
240 learning unit
250 communication unit
30 content server
40 purchase history DB
50 delivery history DB

The invention claimed is:

1. An information processing apparatus comprising:
   an output controller that controls an output of additional information related to a product purchased by a user;
   a speech processor that executes speech recognition to recognize the user on a basis of collected utterance information; and
   the output controller causes the additional information to be output on a basis of the user being recognized by the speech processor, and on a basis of confirmation of completed delivery of the product purchased by the user or confirmation that the product to be purchased by the user has been shipped.

2. The information processing apparatus according to claim 1, wherein
   the output controller causes the additional information to be output on a basis of the user recognized by the speech processor corresponding to an anticipated user of the product.

3. The information processing apparatus according to claim 2, wherein
   the output controller estimates the anticipated user on a basis of purchase history information about the product.

4. The information processing apparatus according to claim 1, wherein
   the output controller controls an output of the additional information on a basis of purchase history information about the product.

5. The information processing apparatus according to claim 4, wherein
   the output controller estimates a state of the product on a basis of the purchase history information or the delivery information about the product, and causes the additional information to be output according to the state of the product.

6. The information processing apparatus according to claim 4, wherein
   the output controller controls an output priority of the additional information on a basis of a purchase count of the product.

7. The information processing apparatus according to claim 6, wherein
   the output controller sets a high output priority for the additional information about a product whose purchase count is less than a predetermined count.

8. The information processing apparatus according to claim 6, wherein
   the output controller sets a low output priority for the additional information about a product whose purchase count is equal to or greater than a predetermined count.

9. The information processing apparatus according to claim 1, wherein
   the output controller controls an output of the additional information on a basis of context information.

10. The information processing apparatus according to claim 1, wherein
the output controller controls an output of the additional information on a basis of purchase origin information when the product has been purchased.

11. The information processing apparatus according to claim 1, wherein
the additional information includes at least any of utilization information, advertising information, or campaign information related to the product.

12. The information processing apparatus according to claim 1, wherein
the output controller causes the additional information to be output on a basis of a request for information by the user being recognized.

13. The information processing apparatus according to claim 1, further comprising:
an outputter that outputs the additional information on a basis of control by the output controller.

14. The information processing apparatus according to claim 1, further comprising:
a sensor that collects sensor information related to the user or the product.

15. An information processing method that is executed by processing circuitry, the information processing method comprising:
controlling an output of additional information related to a product purchased by a user,
executing, by a speech processor, speech recognition to recognize the user on a basis of collected utterance information, and
causing the additional information to be output on a basis of the user being recognized by the speech processor, and on a basis of confirmation of completed delivery of the product purchased by the user or confirmation that the product to be purchased by the user has been shipped.

16. A non-transitory computer-readable medium storing instructions which when executed by processing circuitry cause the processing circuitry to perform an information processing method, the method comprising:
controlling an output of additional information related to a product purchased by a user,
executing speech recognition to recognize the user on a basis of collected utterance information, and
causing the additional information to be output on a basis of the user being recognized, and on a basis of confirmation of completed delivery of the product purchased by the user or confirmation that the product to be purchased by the user has been shipped.

* * * * *